(12) United States Patent
Urushihara et al.

(10) Patent No.: US 7,911,893 B2
(45) Date of Patent: Mar. 22, 2011

(54) DISC DEVICE

(75) Inventors: Kenji Urushihara, Ishikawa (JP);
Yoshikazu Ohmura, Ishikawa (JP);
Tetsuya Okubo, Kanagawa (JP);
Hiroshi Saito, Kanagawa (JP)

(73) Assignee: Panasonic Corporation, Osaka (JP)

( * ) Notice: Subject to any disclaimer, the term of this patent is extended or adjusted under 35 U.S.C. 154(b) by 106 days.

(21) Appl. No.: 12/445,657

(22) PCT Filed: Oct. 16, 2007

(86) PCT No.: PCT/JP2007/070199
§ 371 (c)(1),
(2), (4) Date: Apr. 15, 2009

(87) PCT Pub. No.: WO2008/047808
PCT Pub. Date: Apr. 24, 2008

(65) Prior Publication Data
US 2010/0296373 A1   Nov. 25, 2010

(30) Foreign Application Priority Data

Oct. 16, 2006   (JP) .............................. P2006-281441

(51) Int. Cl.
*G11B 7/00* (2006.01)
(52) U.S. Cl. ................ 369/44.32; 369/53.19; 369/44.11
(58) Field of Classification Search ............... 369/44.32, 369/53.19
See application file for complete search history.

(56) References Cited

U.S. PATENT DOCUMENTS

| 6,654,326 | B1 * | 11/2003 | Park et al. ................ 369/53.19 |
| 2002/0089917 | A1 | 7/2002 | Sogawa et al. |
| 2003/0133397 | A1 | 7/2003 | Nagatsuka |
| 2008/0209458 | A1 | 8/2008 | Jingga et al. |

FOREIGN PATENT DOCUMENTS

| EP | 07 82 9933 | 11/2009 |
| JP | 10-143870 A | 5/1998 |
| JP | 2002-15434 A | 1/2002 |
| JP | 2003-187539 A | 7/2003 |
| JP | 2003-208766 A | 7/2003 |
| JP | 2005-116010 A | 4/2005 |
| JP | PCT/JP2007/070199 | 1/2008 |
| WO | WO 2006/095305 A1 | 9/2006 |

* cited by examiner

*Primary Examiner* — Adam R Giesy
(74) *Attorney, Agent, or Firm* — RatnerPrestia

(57) ABSTRACT

A disc device capable of achieving a slimming down of a tilt adjusting portion is provided. A tilt adjusting member 404 of a tilt adjusting portion 400 moves an optical pickup driving portion 307 along a guide face 401a to adjust a light beam 303b emitted from an optical pickup 303 such that an optical axis 303c is set perpendicularly to a disc 200. Since the tilt adjusting member 404 is moved in a direction oblique to the guide face 401a and a direction perpendicular to the optical pickup driving portion 307, an amount of movement of the tilt adjusting member 404 can be reduced smaller than a necessary amount of tilt adjustment of the optical pickup driving portion 307 and also a slimming down of the tilt adjusting portion 400 can be achieved. In this case, since a top end portion of the optical pickup driving portion 307 is energized by an energizing member 405 to come into contact with the tilt adjusting member 404 and the guide face 401, this top end portion of the optical pickup driving portion 307 can be adjusted to come close to and go away from the disc 200 without wobbling and rattling.

5 Claims, 25 Drawing Sheets

FIG.4
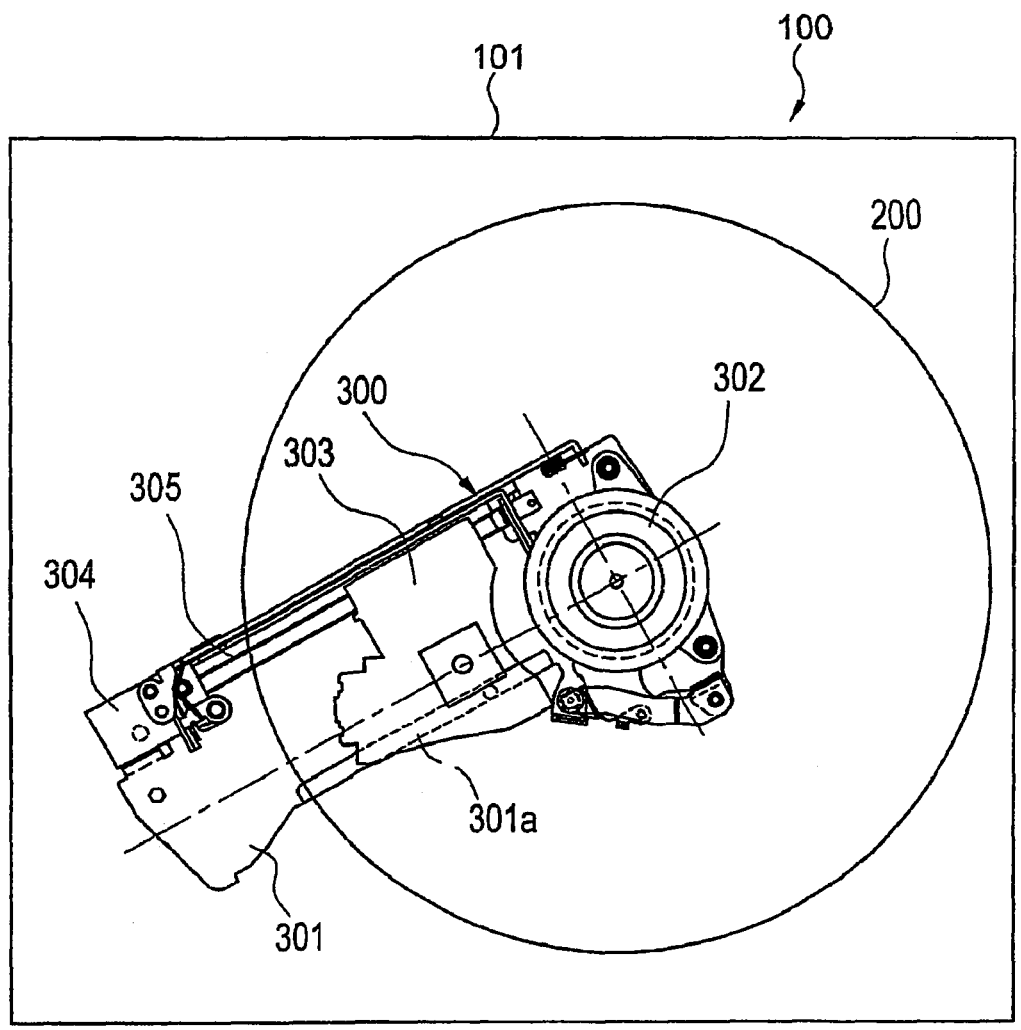
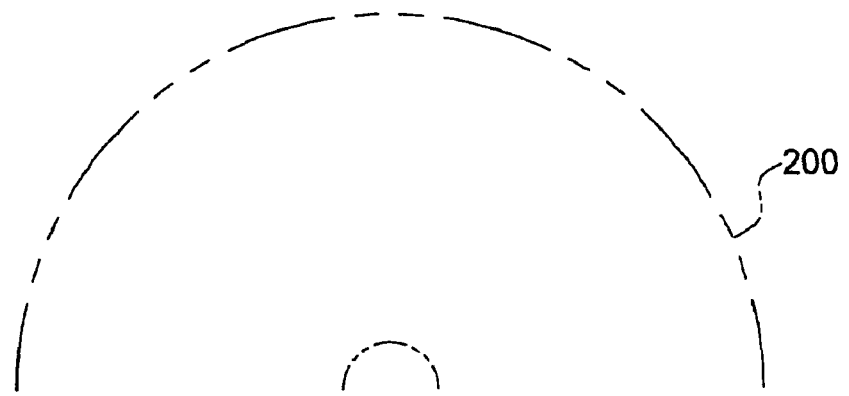

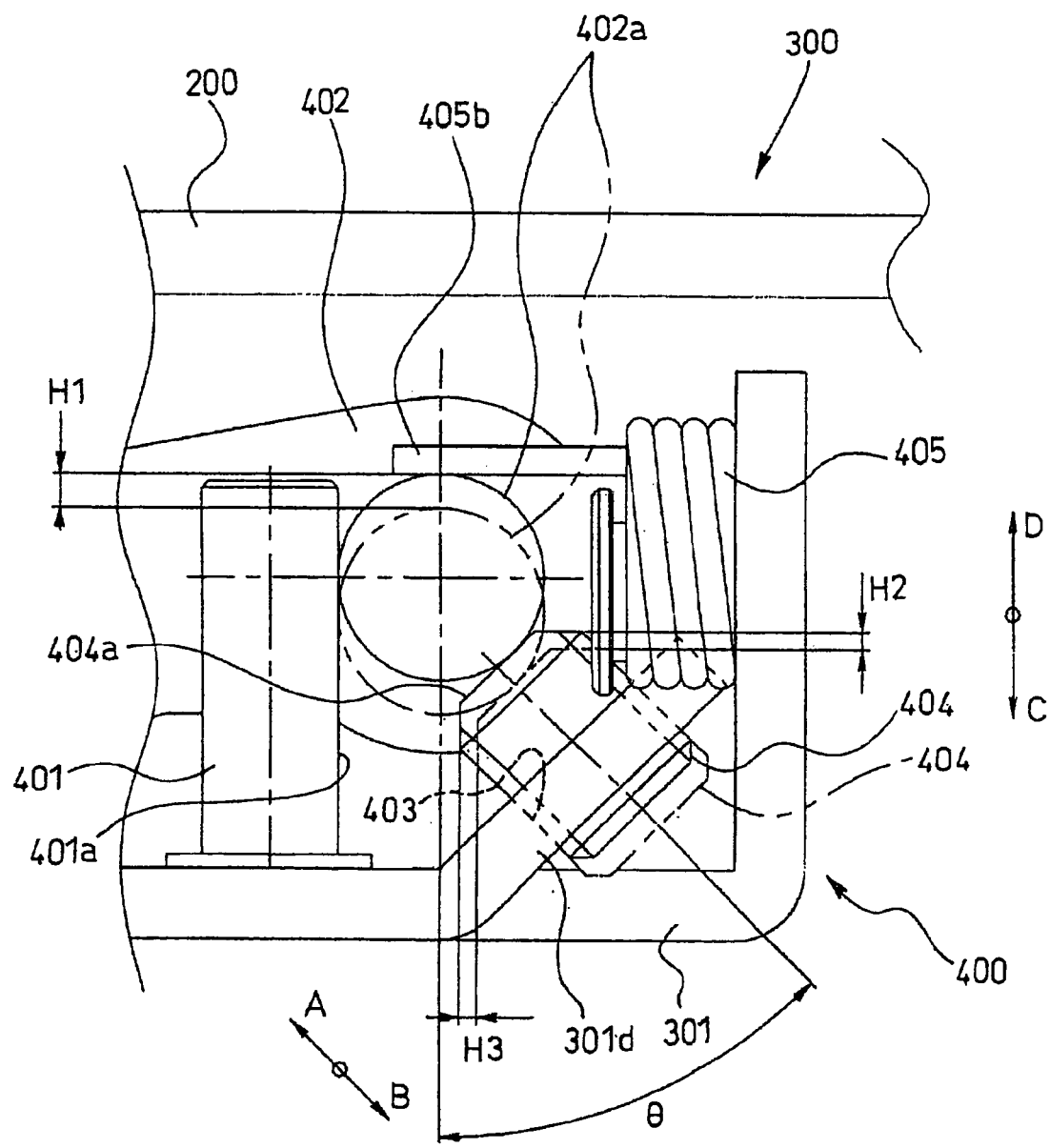

(A)

(B)

FIG.13A
FIG.13B
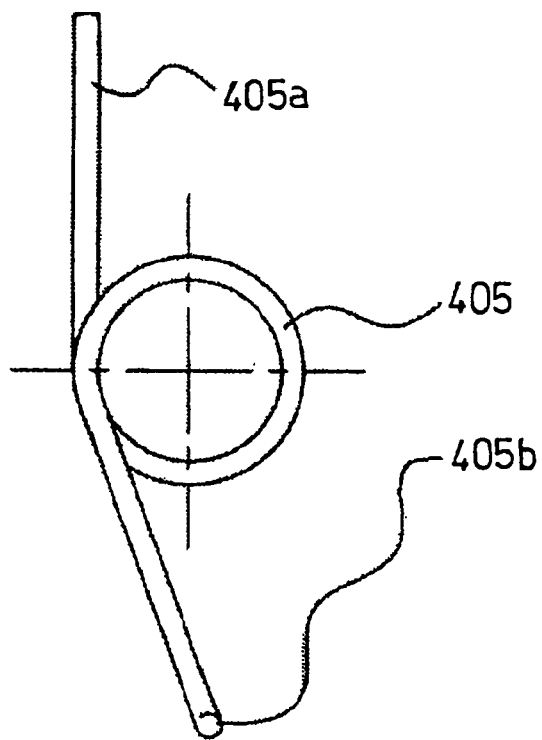
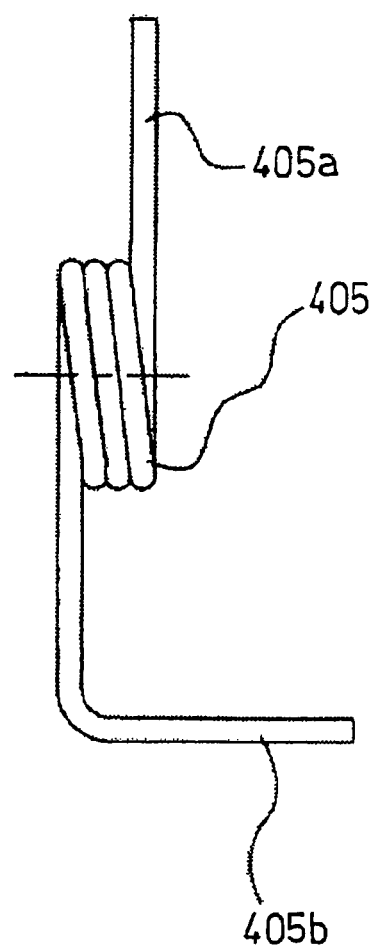

DISC DEVICE

This application is a U.S. National Phase Application of PCT International Application PCT/JP2007/070199.

TECHNICAL FIELD

The present invention relates to a disc device capable of achieving a slimming down of a tilt adjusting portion that can adjust an optical axis of a light beam emitted from an optical pickup in a direction perpendicular to an information recording face of a disc.

BACKGROUND ART

The disc device in the prior art has a tilt adjusting portion shown in FIG. 25.

As shown in FIG. 25, in a tilt adjusting portion 1 provided to the disc device in the prior art, a guide shaft 2 for guiding an optical pickup, a reference face 3 that is perpendicular to a disc loaded on a disc turning portion, an adjusting screw 4 provided to move forward and backward in parallel with the reference face 3, and a coil spring 5 as an energizing member for pressing the guide shaft 2 against the reference face 3 and the adjusting screw 4 are provided. Also, such a configuration is provided that, when the adjusting screw 4 is moved forward and backward, a distance between the guide shaft 2 and the disc loaded on the disc turning portion is changed and also an optical axis of the light beam emitted from the optical pickup is adjusted perpendicularly to the disc (see Patent Literature 1, for example).

Patent Literature 1: JP-A-2005-116010 (FIG. 4)

DISCLOSURE OF THE INVENTION

Problems that the Invention is to Solve

However, in the disc device in the prior art using the adjusting screw 4 that is provided to move forward and backward in parallel with the reference face 3, this adjusting screw 4 is provided in the tilt adjusting direction. Therefore, the adjusting screw 4 must be moved forward and backward in the same distance as the tilt adjusting length of the guide shaft 2 that is required to adjust the optical axis of the light beam emitted from the optical pickup vertically. For this reason, as a length of the adjusting screw 4, a length in which the screws are put together and a length for use in adjustment are always needed. As a result, a dimension in the vertical direction to the disc face is needed long, and thus such a disadvantage exists that a slimming down of the tilt adjusting portion is difficult.

The present invention has been made to solve the problem in the prior art, and it is an object of the present invention to provide a disc device capable of achieving a slimming down of a tilt adjusting portion.

Means for Solving the Problems

A disc device of the present invention, includes a disc turning portion which turns the disc; an optical pickup which performs an information recording operation or an information reproducing operation by emitting a light beam onto the disc turned by the disc turning portion; an optical pickup guiding member which holds the optical pickup movably in a radial direction of the disc loaded on the disc turning portion; an optical pickup driving portion which moves the optical pickup; and a tilt adjusting portion which adjusts an optical axis of the light beam emitted from the optical pickup in a direction perpendicular to the disc that is loaded on the disc turning portion; wherein the tilt adjusting portion has a guide face that is perpendicular to the disc loaded on the disc turning portion, a tilt adjusting portion that moves the optical pickup driving portion along the guide face, and an energizing member that presses the optical pickup driving portion against the tilt adjusting portion and the guide face, and the tilt adjusting member is provided to move forward and backward in a direction oblique to the guide face and a direction perpendicular to the optical pickup driving portion, and the adjusting member and the guide face are arranged so as to oppose to the optical pickup driving portion.

When the recording/reproducing operation of the disc is carried out by holding/turning the disc by the disc turning portion while the optical pickup driving portion moves the optical pickup in the radial direction of the disc along the optical pickup guiding member, the optical beam of the light beam emitted from the optical pickup must be adjusted perpendicularly to the disc by causing the tilt adjusting member of the tilt adjusting portion to move the optical pickup driving portion along the guide face. According to this configuration, the tilt adjusting member can be moved in the direction oblique to the guide face and the direction perpendicular to the optical pickup driving portion. Therefore, an amount of movement of the tilt adjusting member can be reduced smaller than a necessary amount of tilt adjustment of the optical pickup driving portion, i.e., a dimension in the direction perpendicular to the disc face can be shortened, and also a slimming down of the tilt adjusting portion can be achieved. In this case, a top end portion of the optical pickup driving portion is energized by an energizing member to come into contact with the tilt adjusting member and the guide face. Therefore, this top end portion of the optical pickup driving portion can be adjusted to come close to and go away from the disc without wobbling and rattling.

Also, in the disc device of the present invention, the tilt adjusting member is provided in an opposite direction of the disc loaded on the disc turning portion to the optical pickup driving portion.

According to this configuration, when the tilt adjustment is made by the tilt adjusting member, the tilt adjusting member can be adjusted from the opposite side to the disc. Therefore, the disc is not a hindrance in the tilt adjustment, and the workability can be improved.

Also, in the disc device of the present invention, the optical pickup driving portion has a first contact face that contacts the guide face, a second contact face that contacts the tilt adjusting member, and a third contact face that contacts the energizing member, and the first contact face is formed of a flat plane, and the second contact face and the third contact face are formed of a cylindrical face.

According to this configuration, the first contact face of the optical pickup driving portion contacting the guide face is formed as the flat plane. Therefore, the optical pickup driving portion can be moved along the guide face, while holding the constant posture with respect to the guide face without provision of the particular guide. Also, the second contact face contacting the tilt adjusting member of the optical pickup driving portion and the third contact face contacting the energizing member are formed as the cylindrical face. Therefore, the force applied from the tilt adjusting member and the energizing member to the optical pickup driving portion can be always directed toward the center of the optical pickup driving portion, and thus such force can be applied stably without fail.

Also, in the disc device of the present invention, the energizing member presses the optical pickup in a direction being parallel with a moving direction of the optical pickup driving portion when a tilt adjustment is performed.

According to this configuration, the optical pickup driving portion can be always brought into contact with the guide face via its first contact face, the tilt adjusting member via its second contact face, and the energizing member via its third contact face respectively. Therefore, the stable tilt adjustment can be performed.

In addition, an electronic device of the present invention equipped with the above disc device.

According to this configuration, a slimming down of the disc device portion can be achieved, and a compactification can be achieved as a whole electronic device.

Advantage of the Invention

In the present invention, the tilt adjusting member is moved in the direction oblique to the guide face and the direction perpendicular to the optical pickup driving portion. Therefore, the present invention can provide the disc device that includes such advantages that an amount of movement of the tilt adjusting member can be reduced smaller than the necessary amount of tilt adjustment of the optical pickup and also a slimming down of the tilt adjusting portion can be achieved.

BRIEF DESCRIPTION OF THE DRAWINGS

FIG. 4 A top view of the disc device of the present invention in a recording/reproducing mode.

FIG. 11 An enlarged view of an essential portion of the tilt adjusting portion according to the first embodiment of the present invention.

FIG. 13 (A) is a side view of a spring, and (B) is a front view of the spring.

DESCRIPTION OF REFERENCE NUMERALS AND SIGNS

Figure 1:
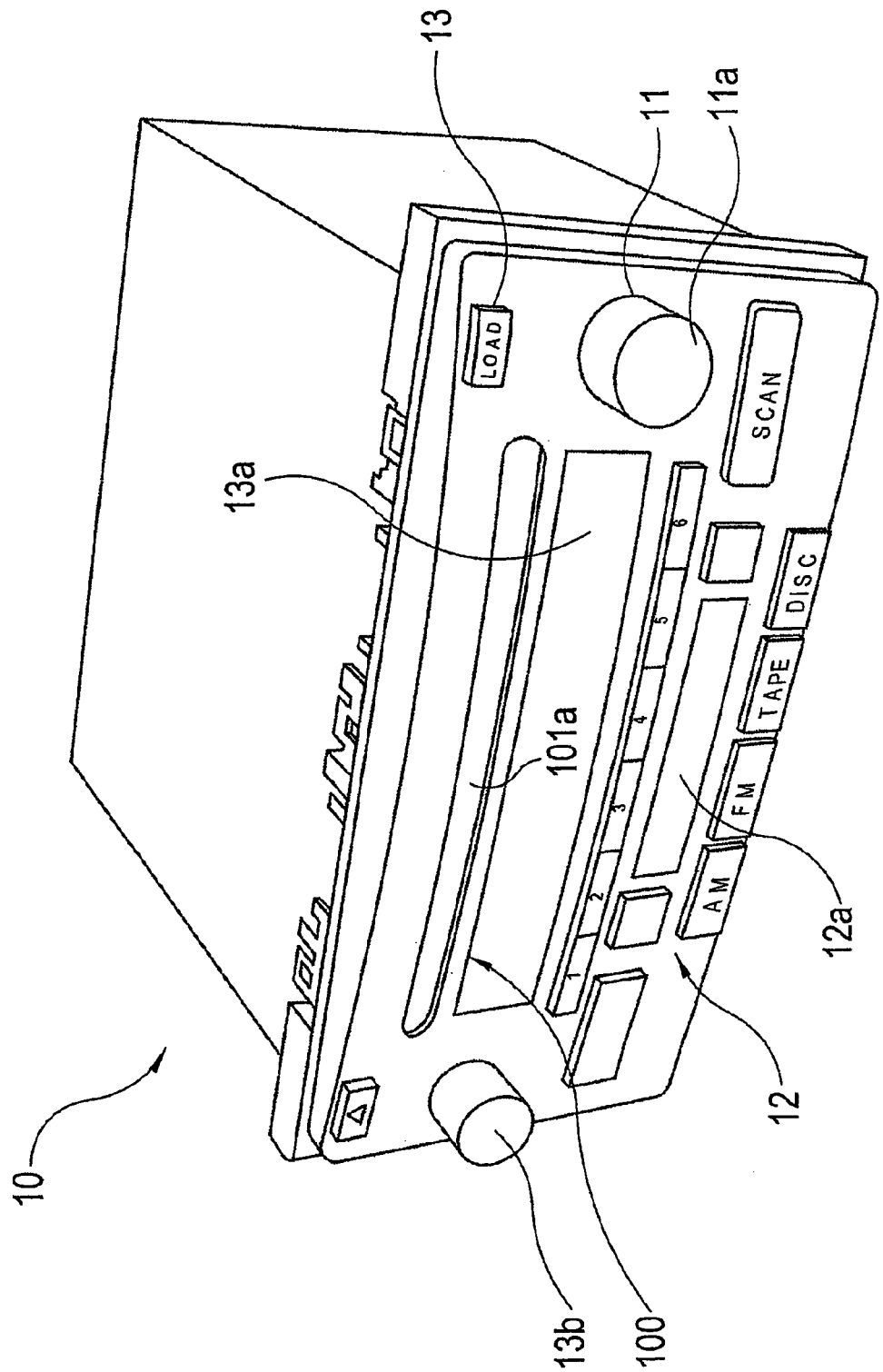
FIG. 1 An overall perspective view of a car audio system as an electronic device in which a disc device according to embodiments of the present invention is built.

10 car audio system (electronic device)
100 disc device
200 disc
301 base chassis
301a guide portion (optical pickup guiding member)
302 turntable (disc turning portion)
303 optical pickup
303b light beam
303c optical axis
304 traverse motor (optical pickup driving portion)
305 feed screw (optical pickup driving portion)
400 tilt adjusting portion
401a guide face
404 adjusting screw (tilt adjusting member)
405 torsion coil spring (energizing member)

BEST MODE FOR CARRYING OUT THE INVENTION

Embodiments of the present invention will be explained with reference to the drawings hereinafter.

First Embodiment

An overall perspective view of a car audio system 10 as an electronic device in which a disc device 100 according to embodiments of the present invention is built is shown in FIG. 1. This car audio system 10 includes a radio 11, a cassette tape player 12, and the like, in addition to the disc device 100. A disc slot 101a for a disc device 100, a tuning knob 11a for the radio, a cassette tape slot 12a, and the like in addition to a display portion 13a, which is shared with all functions, and a power/volume knob 13b are provided to a front panel 13. Also, a controlling portion (not shown) for controlling the radio 11, the cassette tape player 12, the disc device 100, etc. are provided to the inside.

Figure 2:
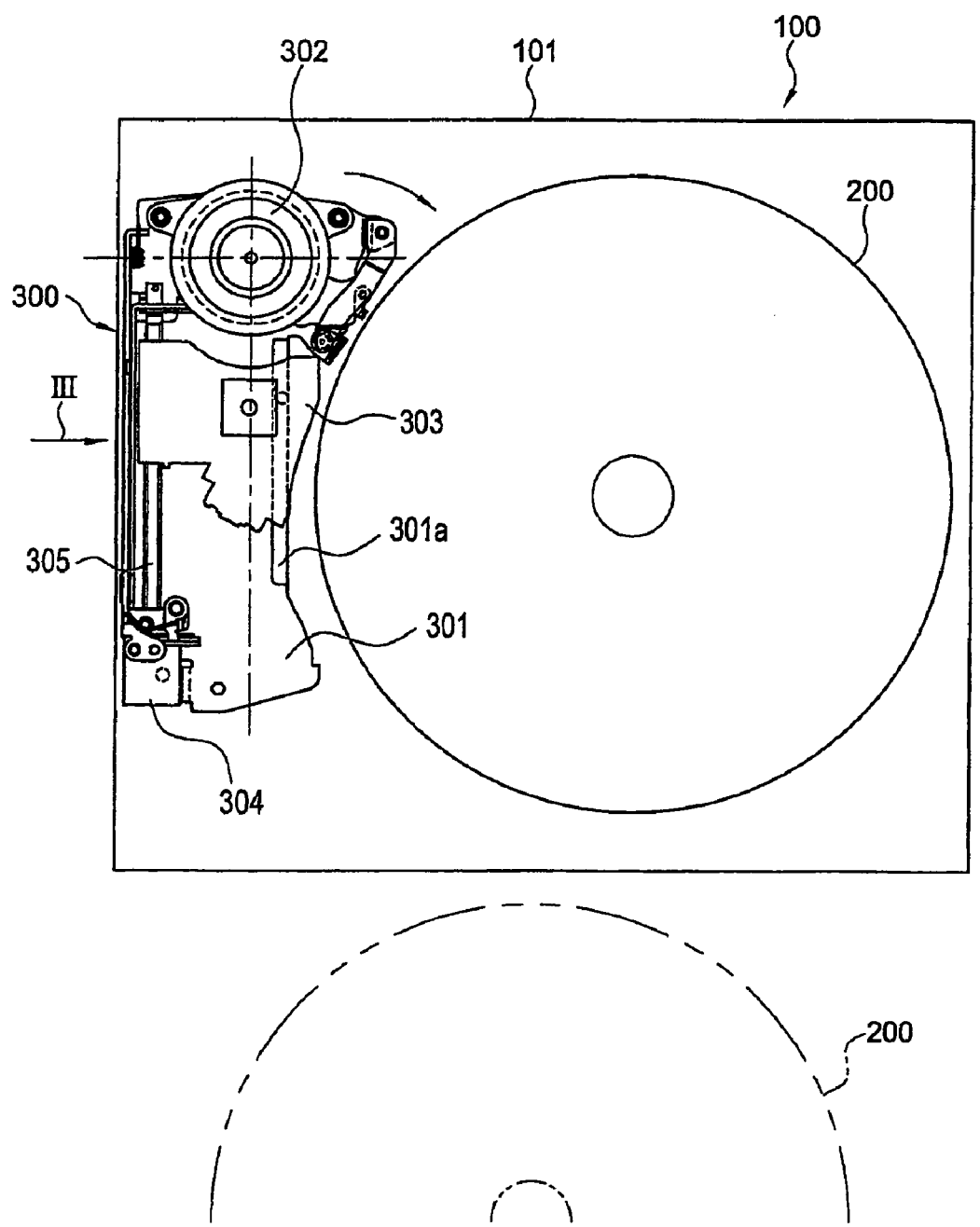
FIG. 2 A top view of a disc device in a standby mode.

Next, the disc device 100 will be explained hereunder. FIG. 2 is a top view of a disc device according to a first embodiment of the present invention in a standby mode, FIG. 3 is a side view of the disc device viewed from an III direction in FIG. 2, and FIG. 4 is a top view of the disc device of the present invention in a recording/reproducing mode.

Figure 3:
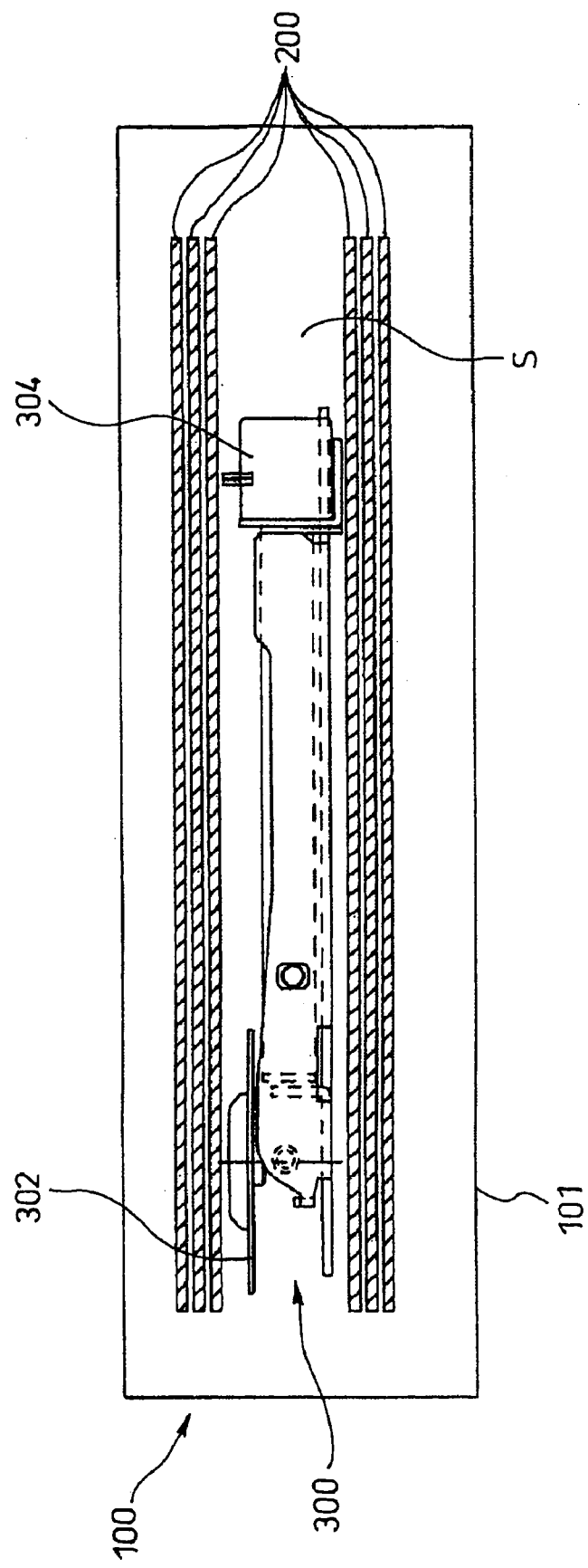
FIG. 3 A side view of the disc device viewed from an III direction in FIG. 2.

In FIG. 2 to FIG. 4, a disc recording/reproducing portion 300 for executing recording/reproducing of a disc 200 is provided in a case 101 of a disc device 100. This disc recording/reproducing portion 300 has a base chassis 301 that can turn in the plane parallel with a face of the disc 200 and can move vertically. A turntable 302 serving as a part of the disc turning portion that turns the disc 200 and an optical pickup 303 for executing the recording or reproducing by emitting a light beam 303b (see FIG. 7) to the disc 200 that is turned by the turntable 302 are provided to the base chassis 301. The optical pickup 303 is provided to move in a radial direction of the disc 200 loaded on the turntable 302, by a guide portion 301a as an optical pickup guiding member, and a feed screw 305 and a traverse motor 304 as an optical pickup driving portion.

As shown in FIG. 2, when no recording and reproducing is applied to the disc 200, the disc recording/reproducing portion 300 is in a standby position, i.e., the disc recording/reproducing portion 300 stands by in a position where this portion 300 does not obstruct loading/unloading of the disc 200 and a vertical movement of the disc 200. In this case, respective discs 200 are held by the tray (not shown) separately to move vertically. When the recording/reproducing is applied to the disc 200, first the tray and the disc 200 are moved vertically to create a working space S under the disc 200 to which the recording/reproducing is applied, as shown in FIG. 3. Then, as shown in FIG. 4, the turntable 302 is positioned under the center of the disc 200 by turning the disc recording/reproducing portion 300. Then, the disc 200 is loaded on the turntable 302 by bringing down the tray that holds the disc 200 as the object, then the disc 200 is turned while being held by the turntable 302, and then the recording/reproducing operations are made by moving the optical pickup 303.

Next, the disc recording/reproducing portion 300 will be explained hereunder.

Figure 5:
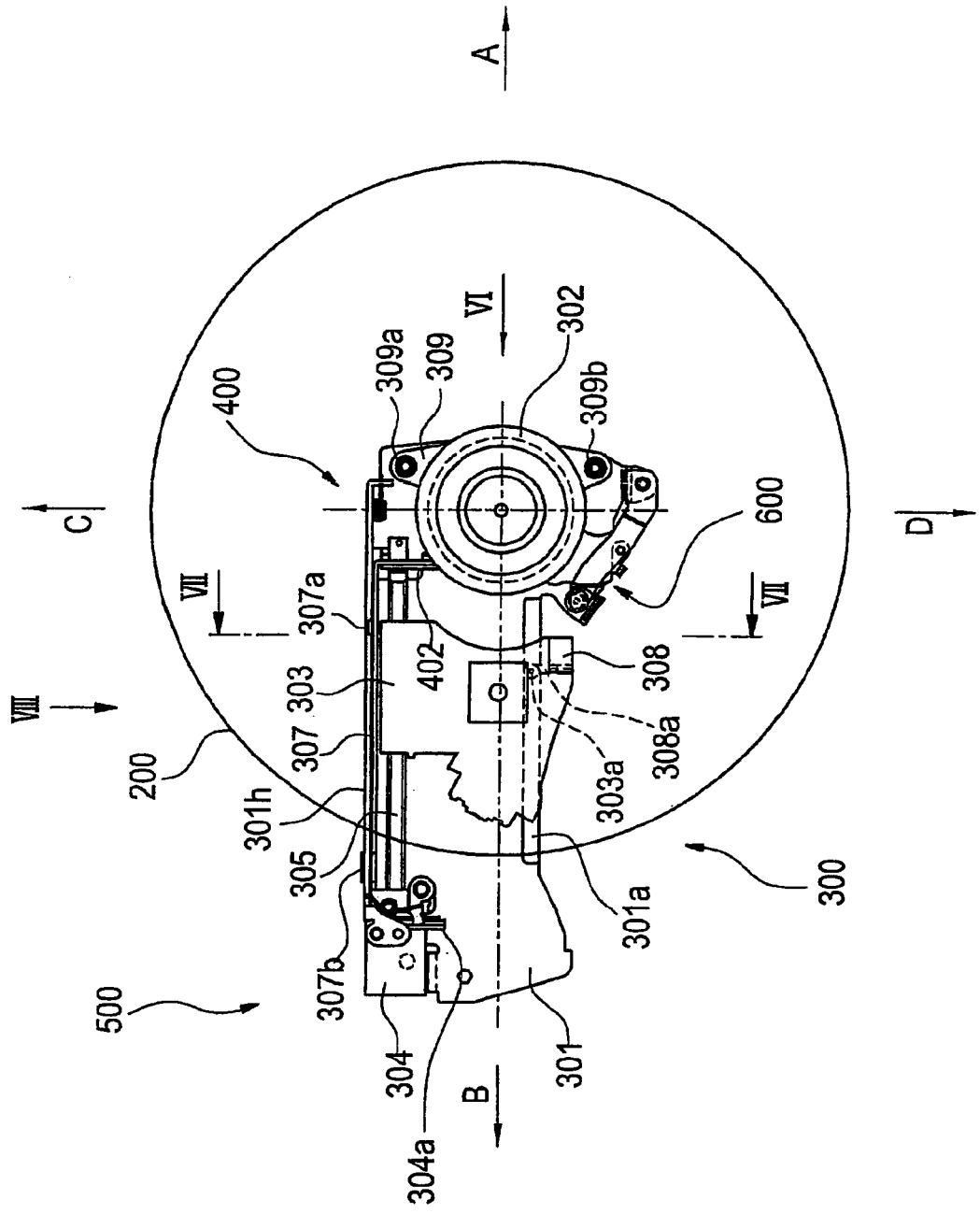
FIG. 5 A top view of a disc recording/reproducing portion according to a first embodiment of the present invention.
Figure 6:
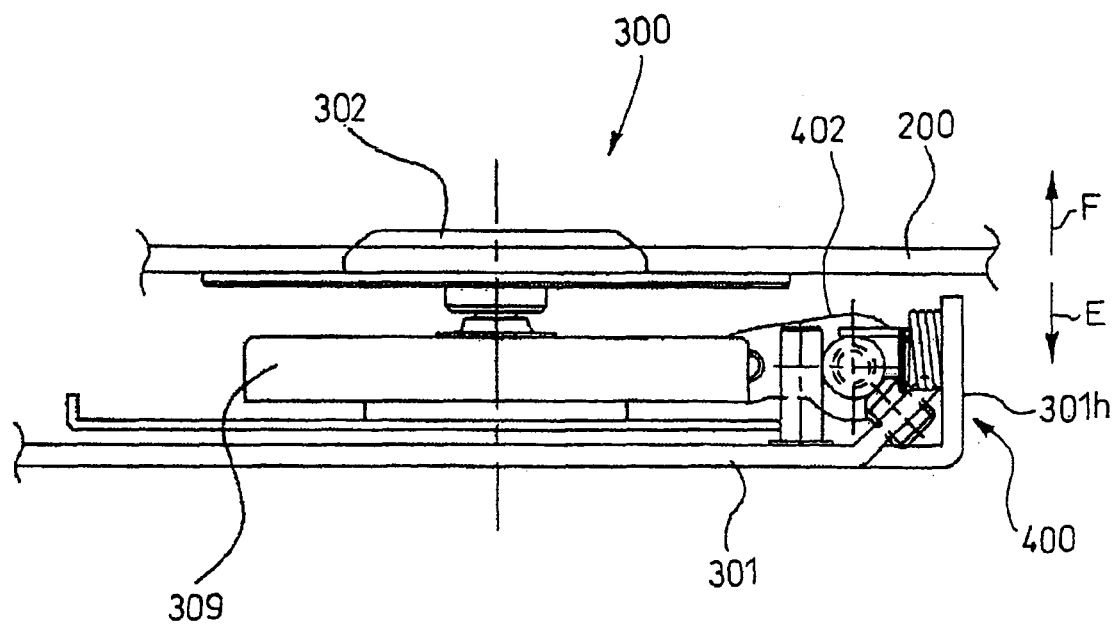
FIG. 6 A side view of the disc recording/reproducing portion viewed from a VI direction in FIG. 5.
Figure 7:
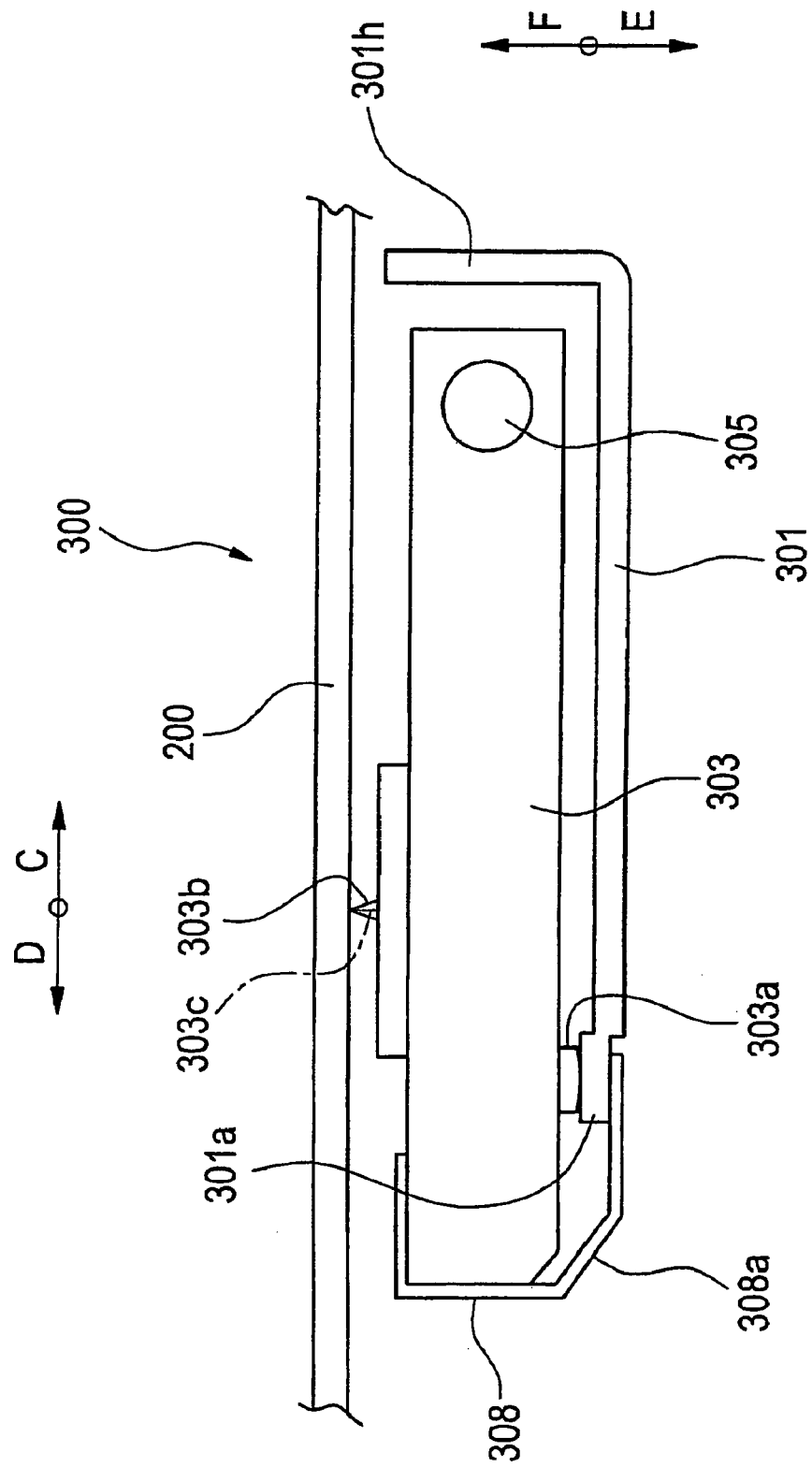
FIG. 7 A side view of an optical pickup viewed from a VII-VII position in FIG. 5.
Figure 8:
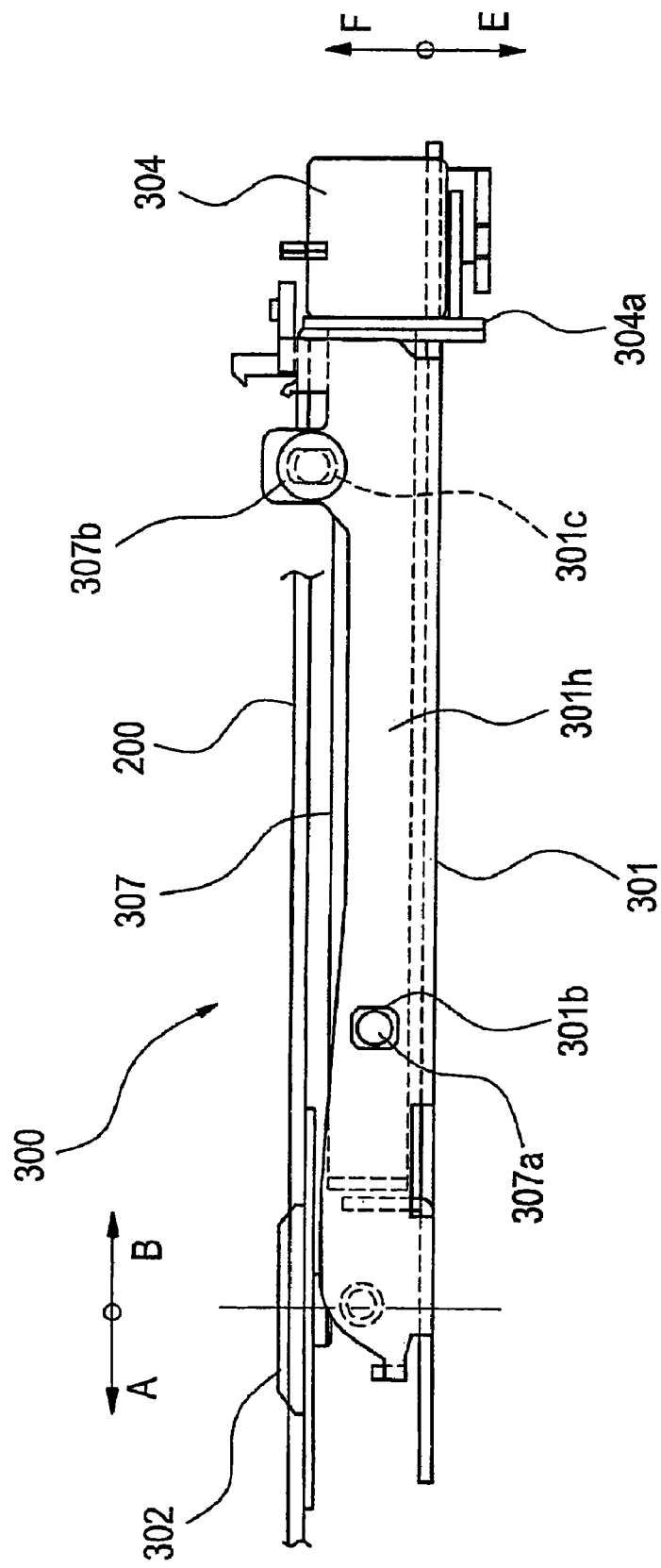
FIG. 8 A side view of a base chassis and a frame.

FIG. 5 is a top view of the disc recording/reproducing portion according to the first embodiment of the present invention, FIG. 6 is a side view of the disc recording/reproducing portion viewed from a VI direction in FIG. 5, FIG. 7 is a side view of an optical pickup viewed from a VII-VII position in FIG. 5, and FIG. 8 is a side view of a base chassis and a frame viewed from a VIII position in FIG. 5.

As shown in FIGS. 5 to 7, the disc recording/reproducing portion 300 has the base chassis 301 that is fitted movably in the E direction and the F direction (see FIG. 6), i.e., in the direction perpendicular to the disc face of the disc 200 loaded on the turntable 302. The turntable 302 for turning the disc 200 while holding the center of the disc 200 and a clamp portion (not shown) for holding the disc 200 on the turntable 302 are provided to an upper face of the top end portion of the base chassis 301. Also, a spindle motor 309 that turns the turntable 302 is provided under the turntable 302. This spindle motor 309 is fitted adjustably to the base chassis 301 via a turntable adjusting portion 600 whose details will be described later.

Also, the feed screw 305 and the traverse motor 304 as a part of an optical pickup driving portion are provided along the longitudinal direction of the base chassis 301. The feed screw 305 is turned/driven by the traverse motor 304. The optical pickup 303 for recording/reproducing information of the disc 200 is provided to the feed screw 305 to engage with grooves of the feed screw 305. The optical pickup 303 can be reciprocally moved by the revolution of the traverse motor 304 in the radial direction of the disc 200 along the feed screw 305.

The traverse motor 304 is fitted to one end of a frame 307 having a substantially U-shaped portion and serving as a part of the optical pickup driving portion via a motor bracket 304a. Also, the top end portion of the feed screw 305 fitted to the traverse motor 304 is held rotatably by a cap 402 (see FIG. 6). The cap 402 is secured to by the frame 307. The top end portion of the frame 307 (the turntable 302 side) is supported adjustably by the base chassis 301 via a tilt adjusting portion 400 described later. Also, a base end portion of the frame 307 (the turning center side of the base chassis 301) is fitted to the base chassis 301 via an optical pickup adjusting portion 500 described later.

As shown in FIG. 7, the guide portion 301a as the optical pickup guiding member is formed on the end portion of the base chassis 301 on the opposite side to the feed screw 305 (the lower end portion in FIG. 5) by bending the end portion of the base chassis 301. That is, since the guide portion 301a is formed by a part of the base chassis 301, the number of components can be reduced. This guide portion 301a is provided in parallel with the feed screw 305 on one level higher than the feed screw 305. A projection portion 303a of the optical pickup 303 contacts the guide portion 301a to move thereon. In this case, a substantially U-shaped elastic member 308 for energizing the projection portion 303a of the optical pickup 303 in the direction to contact the guide portion 301a is provided to the top end portion of the optical pickup 303. A joined portion 308a of the elastic member 308 supports the guide portion 301a of the base chassis 301 from the lower side. Therefore, even when the disc recording/reproducing portion 300 undergoes a disturbance such as a vibration, or the like, such an event can be prevented that the optical pickup 303 goes off the base chassis 301 or wobbles and rattles.

As shown in FIG. 8, a guide hole 301c as a longitudinal hole that is long in the vertical direction is provided in the upper portion of the base end portion (the traverse motor 304 side, i.e., the right side in FIG. 8) of a guide face 301h (see FIG. 6), which is bent in the direction intersecting orthogonally to the disc 200, of the base chassis 301. A guide screw 307b as a moving area restricting portion is fitted to the base end portion of the frame 307 to pass through a guide screw hole 307c. Also, a guide hole 301b as a longitudinal hole that is long in the vertical direction is provided in the top end portion (the turntable 302 side, i.e., the left side in FIG. 8) of the guide face 301h of the base chassis 301. The top end portion of the frame 307 is fitted movably in the guide hole 301b by a boss 307a as a moving area restricting portion. Therefore, an allowable moving range of the frame 307 with respect to the base chassis 301 is restricted by the longitudinal holes 301b, 301c provided at two locations, the boss 307a, and the guide screw 307b.

Also, the base chassis 301 has a tilt adjusting portion 400 that adjusts the light beam 303b (see FIG. 6) emitted from the optical pickup 303 such that an optical axis 303c of the light beam 303b is set perpendicularly to the disc 200 that is turned by the turntable 302, the optical pickup adjusting portion 500 for adjusting the position of the frame 307 that holds the feed screw 305, and the like, and the turntable adjusting portion 600 for adjusting a tilt of the disc loading face of the turntable 302, as described in detail later.

Figure 9:
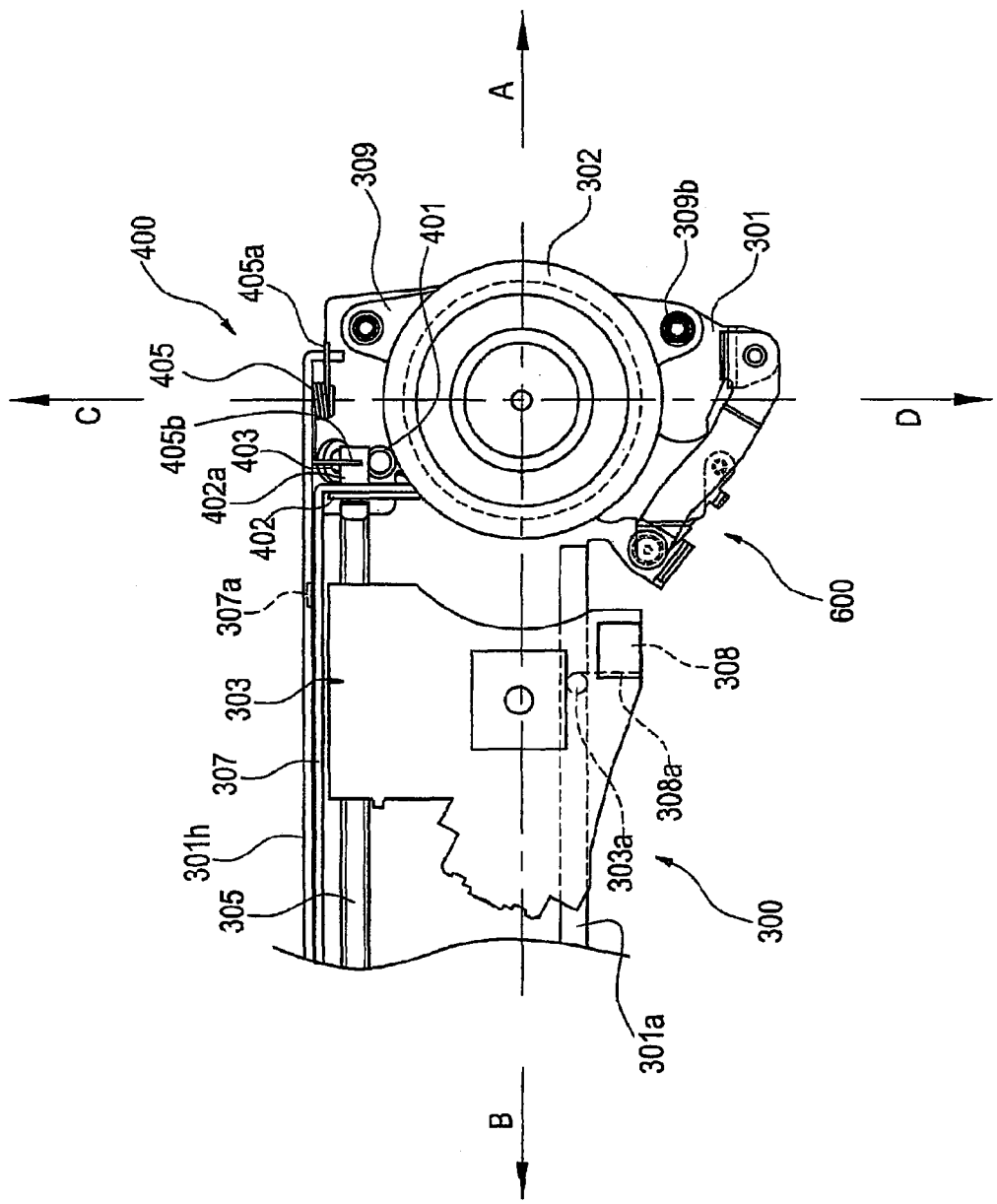
FIG. 9 A top view of a tilt adjusting portion according to the first embodiment of the present invention.

Next, the tilt adjusting portion 400 will be explained in detail hereunder. FIG. 9 is a top view of the tilt adjusting portion 400 according to the first embodiment of the present invention, FIG. 10 is a side view of the tilt adjusting portion 400 according to the first embodiment of the present invention, and FIG. 11 is an enlarged view of an essential portion of the tilt adjusting portion 400 according to the first embodiment of the present invention.

Figure 10:
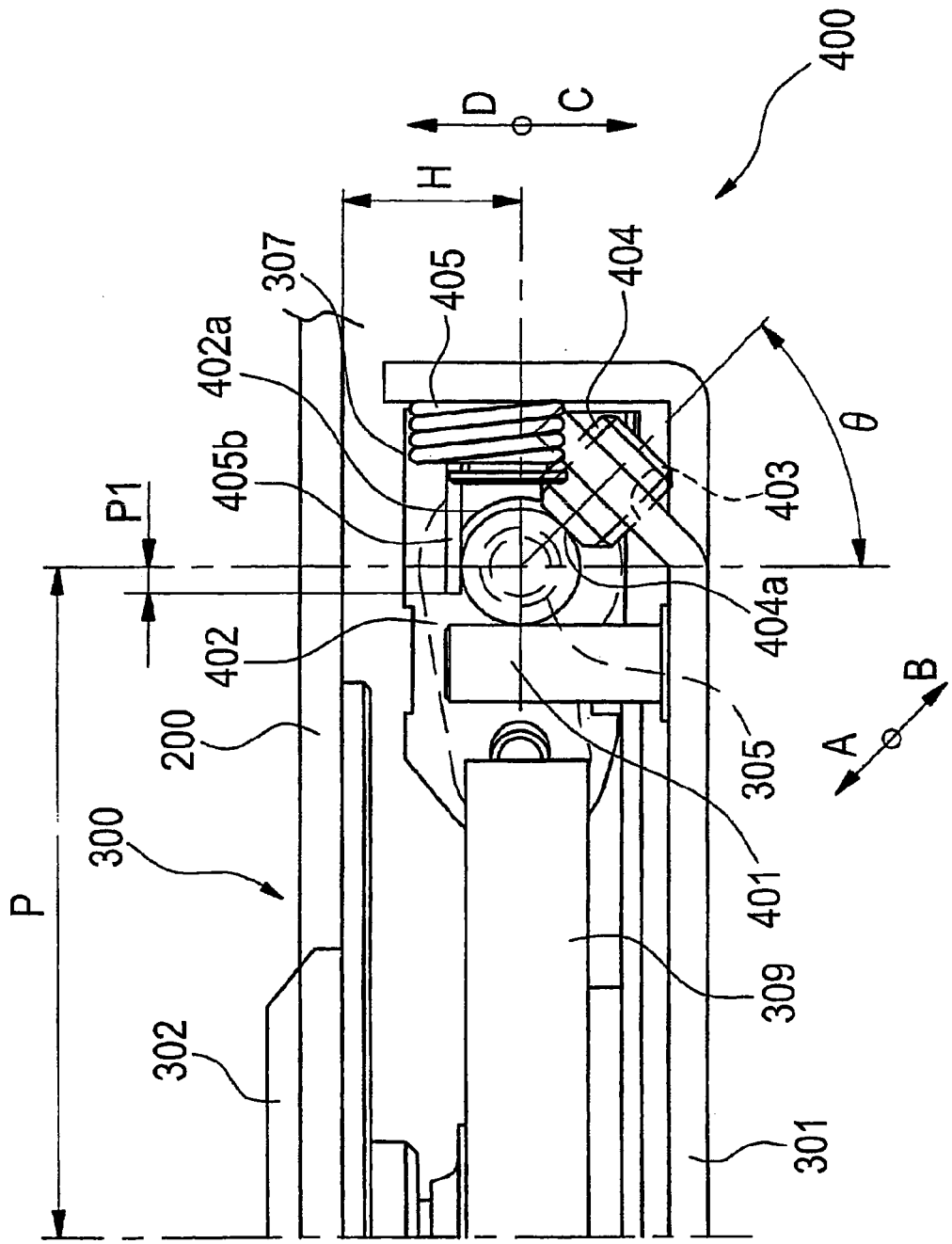
FIG. 10 A side view of the tilt adjusting portion according to the first embodiment of the present invention.

As shown in FIGS. 9 to 11, the tilt adjusting portion 400 is provided on the base chassis 301, and has a guide shaft 401 constituting a guide face 401a, an adjust screw 404 for moving the cap 402, and a torsion coil spring 405 as an energizing member. The guide face 401a is an outer peripheral face of the guide shaft 401, which is parallel with the axial direction of the guide shaft 401, and is a curved face. This outer peripheral face (i.e., the guide face 401a) and the disc face of the disc 200 that is loaded on the turntable 302 as a part of the disc turning portion have a perpendicular relationship. In other words, a normal of the guide face 401a and the disc face of the disc 200 loaded on the turntable 302 have a non-parallel relationship.

In this case, the guide face 401a is not limited to the curved face, and may be formed on a planar face. In such case, this planar face and the disc face of the disc 200 loaded on the turntable 302 may have a perpendicular relationship. Also, the cap 402 has a first contact face that contacts the guide shaft 401, a second contact face that contacts the adjust screw 404, and a third contact face that contacts the torsion coil spring 405. Here, the first to third contact faces are provided on a cylindrical portion 402a provided to the cap 402.

A hole into which the top end of the feed screw 305 is inserted is provided in the center of the cap 402. When the top end of the feed screw 305 is inserted into the hole of the cap 402, the feed screw 305 is supported rotatably by the cap 402. Also, the feed screw 305 is energized by an energizing means (not shown) in the direction along which the rotating shaft of the feed screw comes close to the cap 402 (the A direction in FIG. 9).

As shown in FIG. 11, the adjust screw 404 is provided in the oblique direction to the guide shaft 401 constituting the guide face 401a (in the direction at an angle θ to the guide shaft 401 in FIG. 10). The adjust screw 404 can be fitted by forming a bent-up portion 301d, which is formed by bending up a part of the base chassis 301, and then providing a tap 403 to this bent-up portion 301d to be screwed.

Figure 12A:
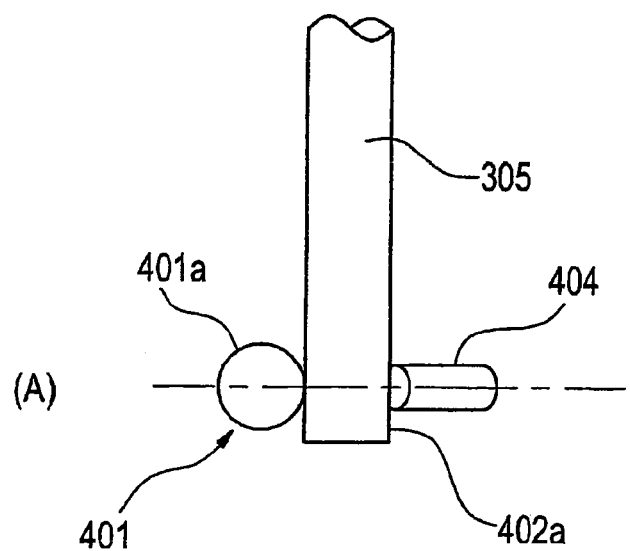
FIG. 12 (A) and (B) are an explanatory view showing a fitted state of an adjust screw respectively.
Figure 12B:
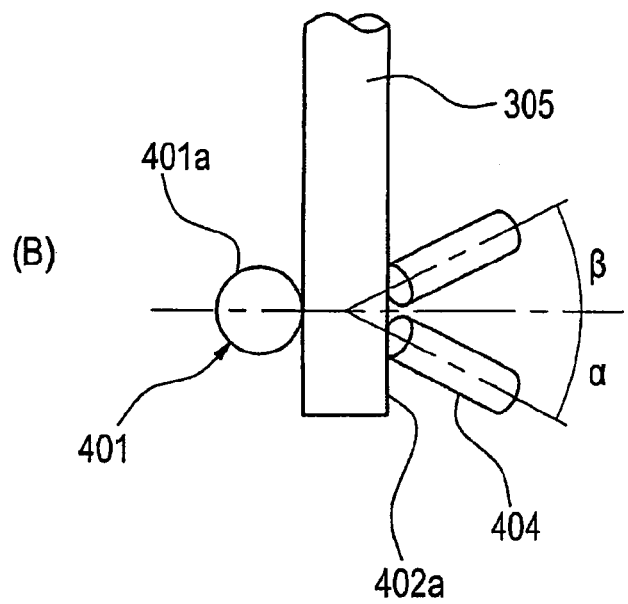

The adjust screw 404 is provided in the oblique direction to the guide face 401a. For example, as shown in FIG. 12(A), the adjust screw 404 may be provided to intersect orthogonally to the guide face 401a, when viewed from the top, and obliquely to the vertical direction. Also, as shown in FIG. 12(B), the adjust screw 404 may be provided obliquely to the guide face 401a (an angle α or β, when viewed from the top, and obliquely to the vertical direction. In other words, when the guide face 401a is a curved face, the adjust screw 404 may be provided such that, when viewed from the top, a normal of the guide face 401a passing through a contact point between the guide face 401a and the cap 402 is in parallel with the axial direction of the adjust screw 404 in the case shown in FIG. 12(A), while a normal of the guide face 401a passing through a contact point between the guide face 401a and the cap 402 and the axial direction of the adjust screw 404 constitute an angle α or β in the case shown in FIG. 12(B). Also, when the guide face 401a is a planar face, the adjust screw 404 may be provided such that a perpendicular of the guide face 401a is in parallel with the axial direction of the adjust screw 404 in the case shown in FIG. 12(A), while a perpendicular of the guide face 401a and the axial direction of the adjust screw 404 constitute an angle α or β in the case shown in FIG. 12(B).

Also, the adjust screw 404 is arranged with respect to the cylindrical portion 402a of the cap 402 in the opposite direction to the disc 200 loaded on the turntable 302 (in the downward direction in FIG. 11). Therefore, the cylindrical portion 402a can be adjusted by screwing/unscrewing the adjust screw 404. In other words, the adjust screw 404 ascends (in the A direction in FIG. 11) when the adjust screw 404 is moved forward by screwing, and the adjust screw 404 descends (in the B direction in FIG. 11) when the adjust screw 404 is moved back by unscrewing. As a result, the turntable 302 can be adjusted even when the disc 200 is loaded, and thus the workability can be improved. A plane portion 404a is provided to the top end of the adjust screw 404 on the cap 402 side, and this plane portion 404a causes the cylindrical portion 402a of the cap 402 to move along the guide shaft 401.

As shown in FIG. 11, the torsion coil spring 405 energizes the cylindrical portion 402a of the cap 402 toward the adjust screw 404 and the guide shaft 401. As shown in FIG. 13, one arm 405a of the torsion coil spring 405 engages with the base chassis 301, and the other arm 405b contacts the cylindrical portion 402a of the cap 402. Here, as shown in FIG. 13(B), the other arm 405b is bent horizontally to contact the cylindrical portion 402a of the cap 402 horizontally. Therefore, the torsion coil spring 405 energizes straightly the cylindrical portion 402a of the cap 402 in the direction to come close to the base chassis 301 (the C direction in FIG. 11).

Therefore, when the cylindrical portion 402a of the cap 402 is moved vertically along the guide shaft 401 by turning the adjust screw 404, the top end portion of the frame 307 is also moved vertically. Thus, a distance between the disc 200 loaded on the turntable 302 and the feed screw 305 is changed. Accordingly, the light beam 303b emitted from the optical pickup 303 can be adjusted such that its optical axis 303c is set perpendicularly to the disc 200.

Also, as shown in FIG. 10 and FIG. 11, a distance between an axial center of the cylindrical portion 402a of the cap 402 and a lower surface of the disc 200 loaded on the turntable 302 in the height direction (a dimension H in FIG. 10) is changed along the guide shaft 401. Also, a contact between the cylindrical portion 402a of the cap 402 and the plane portion 404a of the adjust screw 404 can be maintained while changing a contact point between both components. Therefore, an amount of movement of the adjust screw 404 in the height direction (a dimension H2 in FIG. 11) required in response to an amount of movement of the cap 402 in the height direction (a dimension H1 in FIG. 11) in the tilt adjusting operation can be reduced. For example, in the case of θ=45°, H2=0.5×H1.

Similarly, an amount of movement of the adjust screw 404 in the lateral direction (a dimension H3 in FIG. 11) required in response to an amount of movement of the cap 402 in the height direction (a dimension H1 in FIG. 11) in the tilt adjusting operation is given as H3=0.5×H1 in the case of θ=45°, for example.

In this manner, the adjust screw 404 is moved in the oblique direction to the guide face 401a and in the vertical direction to the frame 307. Therefore, an amount of movement of the adjust screw 404 can be reduced smaller than a necessary amount of tilt adjustment of the frame 307. As a result, a slimming down of the tilt adjusting portion can be achieved. Here, the top end portion of the cap 402 that is fitted to the frame 307 is energized by the torsion coil spring 405 to come into contact with the adjust screw 404 and the guide face 401a. Therefore, the top end portion of the optical pickup driving portion can be adjusted to come close to and go away from the disc without wobbling and rattling.

Also, even though a distance between the cap 402 and the disc 200 loaded on the turntable 302 in the height direction (a dimension H in FIG. 10) is changed in the tilt adjusting operation, a contact between the guide shaft 401 and the cap 402 can be kept. Hence, a pitch between a center of the feed screw 305 and a center of the disc 200 (a dimension P in FIG. 10) is always kept constant, and thus the stable recording/reproducing operation can be carried out.

Also, the torsion coil spring 405 is constructed to energize the cap 402 toward the base chassis 301 (the C direction in FIG. 10), a thickness of the optical pickup adjusting portion 400 is influenced even when a margin is ensured in an engagement amount between the arm 405b of the torsion coil spring 405 and the cylindrical portion 402a of the cap 402 (a dimension P1 in FIG. 10). Thus, a stable energizing and a slimming down of the optical pickup adjusting portion 400 become mutually compatible.

Also, a contact portion of the projection portion 303a of the optical pickup 303 to the guide portion 301a is formed like an almost hemispherical shape. Therefore, even when the feed screw 305 is moved in the E direction in FIG. 7 or the F direction in FIG. 7 by the tilt adjusting portion 400 and then the optical pickup 303 fitted into and guided by the feed screw 305 is tilted on a contact point between the projection portion 303a and the guide portion 301a as a fulcrum, the projection portion 303a of the optical pickup 303 and the guide portion 301a can be joined stably.

Figure 14:
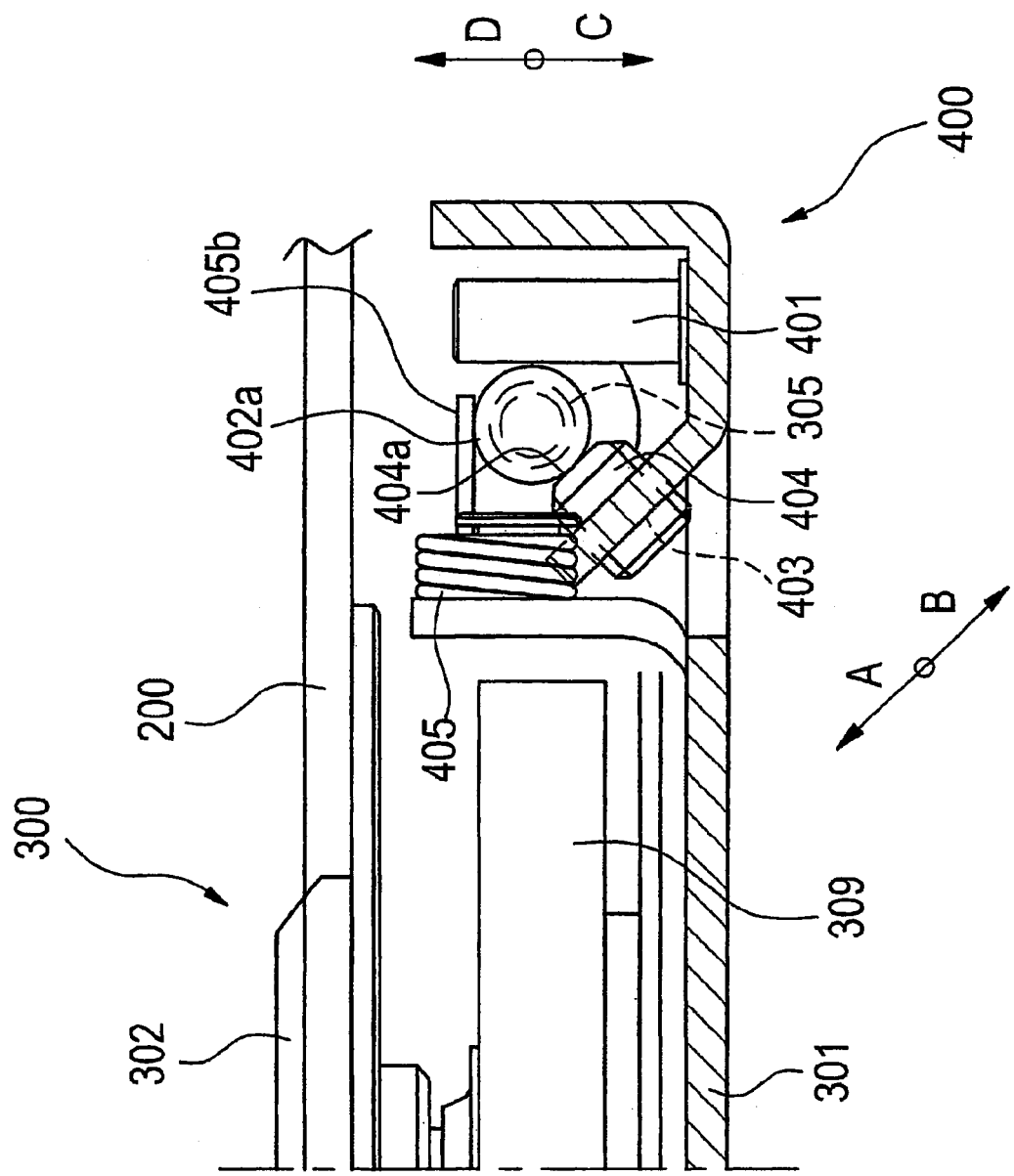
FIG. 14 A sectional view showing another example of the way to fit the adjust screw.

In the above embodiment, the guide shaft 401 is arranged on the center side of the turntable 302, and the adjust screw 404 is arranged on the outer side. In this case, as shown in FIG. 14, the adjust screw 404 may be arranged on the center side, and the guide shaft 401 may be arranged on the outer side.

Also, in the above embodiment, the traverse motor 304 and the feed screw 305 are constructed integrally. According to the present invention, a power transmitting portion such as a gear, or the like, for example, may be provided between the traverse motor 304 and the feed screw 305. In this case, the similar tilt adjusting portion 400 can be realized by providing the cap 402 to both end portions of the feed screw 305.

Also, in the above embodiment, both a function of transmitting a driving force to move the optical pickup 303 to the inner periphery and the outer periphery and a function of guiding a movement of the optical pickup 303 are performed compatibly by the feed screw 305. According to the present invention, a guiding member different from the feed screw 305 may be provided and the optical pickup may be tilted to this guiding member.

Also, in the above embodiment, the base chassis 301 and the cap 402 are energized by the torsion coil spring 405. According to the present invention, both members may be energized by another energizing member except the torsion coil spring (e.g., a plate spring, a tensile coil spring, a compression spring, or the like).

Also, the contact portions between the cap 402 and the guide shaft 401 and between the plane portion 404a of the adjust screw 404 and the arm 404b of the torsion coil spring 405 are implemented by the cylindrical portion 402a having the same diameter and provided to the cap 402. According to the present invention, respective contact portions may be implemented by cylindrical faces having a different diameter respectively.

Also, in the above embodiment, the tilt adjusting portion 400 is implemented by adjusting a height of the guiding portion of the optical pickup 303. According to the present invention, the similar shapes to the cylindrical portion 402a of the cap 402 are provided to the spindle motor 309, and thus the tilt adjustment may be realized by adjusting a height of the spindle motor 309.

Next, the optical pickup adjusting portion 500 as the tilt adjusting portion will be explained hereunder.

Figure 15:
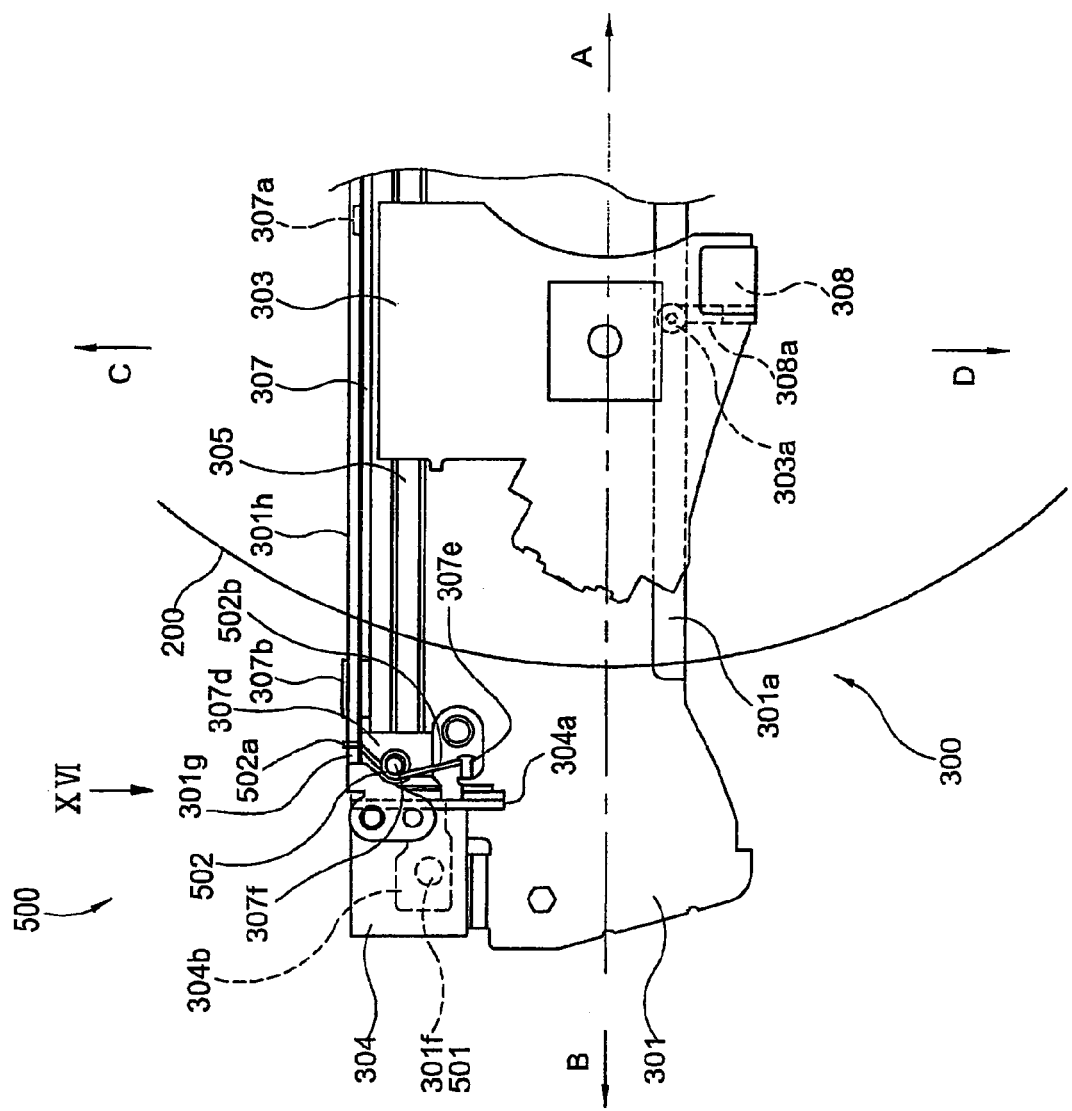
FIG. 15 A top view of an optical pickup adjusting portion.
Figure 16:
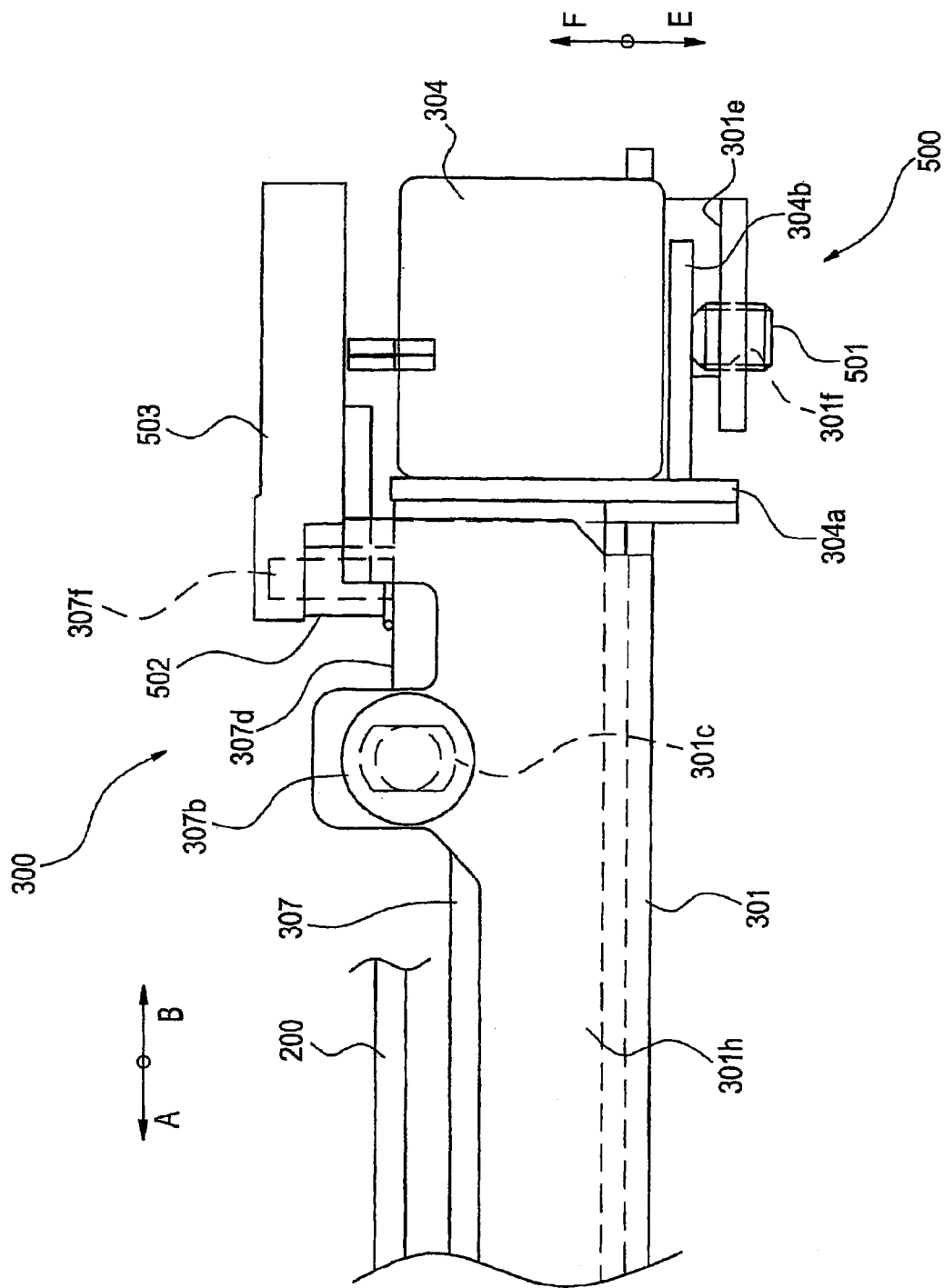
FIG. 16 A side view of the optical pickup adjusting portion viewed from a XVI direction in FIG. 15.
Figure 17:
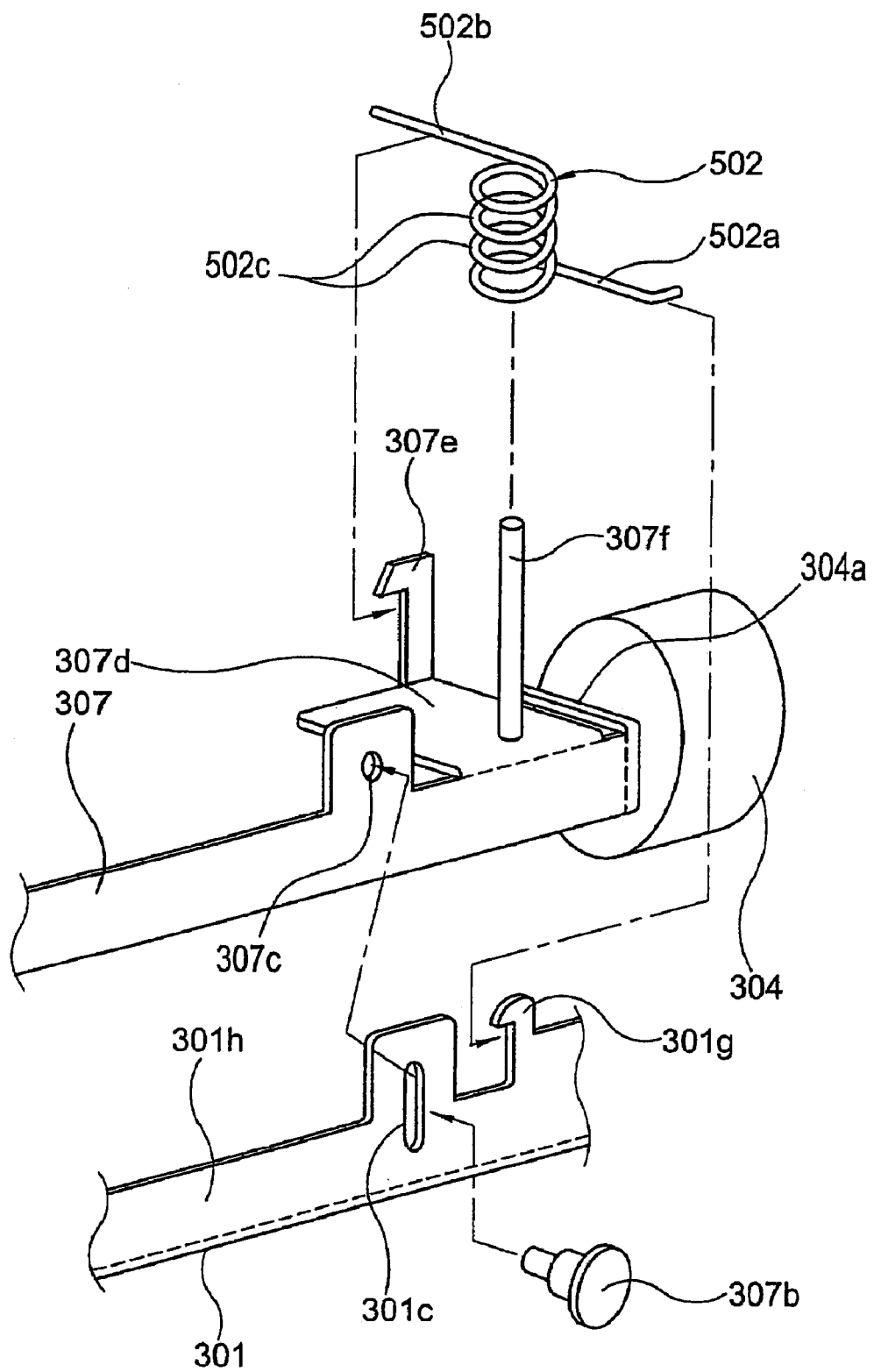
FIG. 17 An exploded perspective view of the optical pickup adjusting portion.

FIG. 15 is a top view of the optical pickup adjusting portion, FIG. 16 is a side view of the optical pickup adjusting portion viewed from a XVI direction in FIG. 15, and FIG. 17 is an exploded perspective view of the optical pickup adjusting portion.

In FIG. 15 and FIG. 16, the optical pickup adjusting portion 500 can change a distance between the disc 200 loaded on the turntable 302 and the frame 307 to which the feed screw 305 and the traverse motor 304 are fitted, and thus can adjust the light beam 303b emitted from the optical pickup 303 such that its optical axis 303c is set perpendicularly to the disc 200.

Although as already explained schematically in FIG. 8, as shown in FIG. 16 and FIG. 17, the guide hole 301c as the longitudinal hole that is long in the vertical direction is provided in the upper portion of the base end portion (the traverse motor 304 side, i.e., the right side in FIG. 8) of the guide face 301h (see FIG. 6), which is bent in the direction intersecting orthogonally to the disc 200, of the base chassis 301. Also, the guide screw hole 307c is provided to the base end portion of the frame 307, and the guide screw 307b as the moving area restricting portion is fitted to the guide screw hole 307c to pass through the guide hole 301c. As a result, the frame 307 is fitted movably in the directions E, F with respect to the base chassis 301, and an allowable moving range of the frame 307 with respect to the base chassis 301 is restricted.

Also, as shown in FIG. 8, it is desired that the guide hole 301b as the longitudinal hole that is long in the vertical direction should be provided in the top end portion (the turntable 302 side, i.e., the left side in FIG. 8) of the guide face 301h of the base chassis 301, and the top end portion of the frame 307 should be fitted movably by the boss 307a as the moving area restricting portion. Therefore, the allowable moving range of the frame 307 with respect to the base chassis 301 can be restricted by the longitudinal holes 301b, 301c provided at two locations without fail.

As shown in FIG. 17, a spring hitching portion 307e that projects upwardly to latch an arm 502b of a spring 502, which acts as a first energizing member, is provided to a horizontal portion 307d that is formed by bending the base end portion of the frame 307. Also, a spring supporting rod 307f for supporting the spring 502 is provided upright in the center of the horizontal portion 307d. In contrast, a spring hitching claw 301g is provided on the base chassis 301 side, and also a fixing bracket 503 is provided to hold the spring 502 between horizontal portion 307d of the frame 307 and this bracket.

Therefore, a main body 502c of the coil spring 502 is fitted onto the spring supporting rod 307f, then one arm 502a of the coil spring 502 is hitched on the spring hitching claw 301g of the base chassis 301, and the other arm 502b of the coil spring 502 is hitched on the spring hitching portion 307e of the frame 307. Accordingly, the coil spring 502 energizes the frame 307 in the direction toward the rotation center of the disc 200 (in the A direction in FIG. 15). Also, the coil spring 502 is provided between horizontal portion 307d of the frame 307 and the fixing bracket 503, and energizes the frame 307 in the direction to open both members, i.e., to put down the base end portion of the frame 307 (in the E direction in FIG. 16).

Meanwhile, a receiving portion 301e is formed on the base end portion of the base chassis 301 to position under the traverse motor 304 horizontally. An internal thread portion 301f is formed in this receiving portion 301e. An adjust screw 501 serving as an adjusting member of the optical pickup adjusting portion 500 is screwed into the internal thread portion 301f, and can be moved in the directions E, F in FIG. 16. A top end (an upper end in FIG. 16) of the adjust screw 501 comes into contact with a lower portion 304b of the motor bracket 304a, which supports the traverse motor 304, such that the motor bracket 304a can be adjusted in the directions E, F by the adjust screw 501. In other words, the motor bracket 304a is lifted in the direction F against the energizing force of the coil spring 502 by turning the adjust screw 501 forward.

As described above, the optical pickup driving portion has the traverse motor 304, the feed screw 305, the frame 307, and the cap 402. Also, one coil spring 502 has both a function of the compression spring (the first energizing member) that energizes the frame 307 in the opposite direction to the adjusting direction of the optical pickup adjusting portion 500, and a function of the torsion coil spring (a second energizing member) that energizes the frame 307 in the direction except the adjusting direction of the optical pickup adjusting portion 500 (here, energizes the frame 307 toward the turntable 302 side). As a result, the number of components can be reduced, and a slimming down of the optical pickup adjusting portion 500 can be achieved.

Also, when a distance between the traverse motor 304 and the disc 200 put on the turntable 302 is adjusted by moving the adjust screw 501, the tilt adjustment for adjusting the light beam 303b emitted from the optical pickup 303 such that its optical axis 303c is set perpendicularly to the disc 200 put on the turntable 302 can be carried out.

Also, since the frame 307 is energized by the coil spring 502, the wobble and rattle of the frame 307, and the feed screw 305 and the optical pickup 303, which are fitted integrally to this frame, caused due to the disturbance such as the vibration, or the like can be prevented.

Also, moving areas of the boss 307a and the guide screw 307b of the frame 307 are restricted by the guide hole 301b and the guide hole 301c provided to the base chassis 301. Therefore, even though an impact in excess of a spring load is applied to the coil spring 502, the frame 307 held with a pressure by the coil spring 502, the optical pickup 303 fitted integrally with the frame 307, and the like during the transportation of the products, or the like and then the frame 307 is moved away from the base chassis 301 (in the direction F in FIG. 8), the boss 307a and the guide screw 307b provided to the frame 307 are brought into contact with the guide holes 301c, 301b of the base chassis 301. As a result, such a situation can be prevented that a load for causing a failure of the coil spring 502 is applied by an impact, or the like.

Next, the turntable adjusting portion 600 as the turntable adjusting portion will be explained hereunder.

Figure 18:
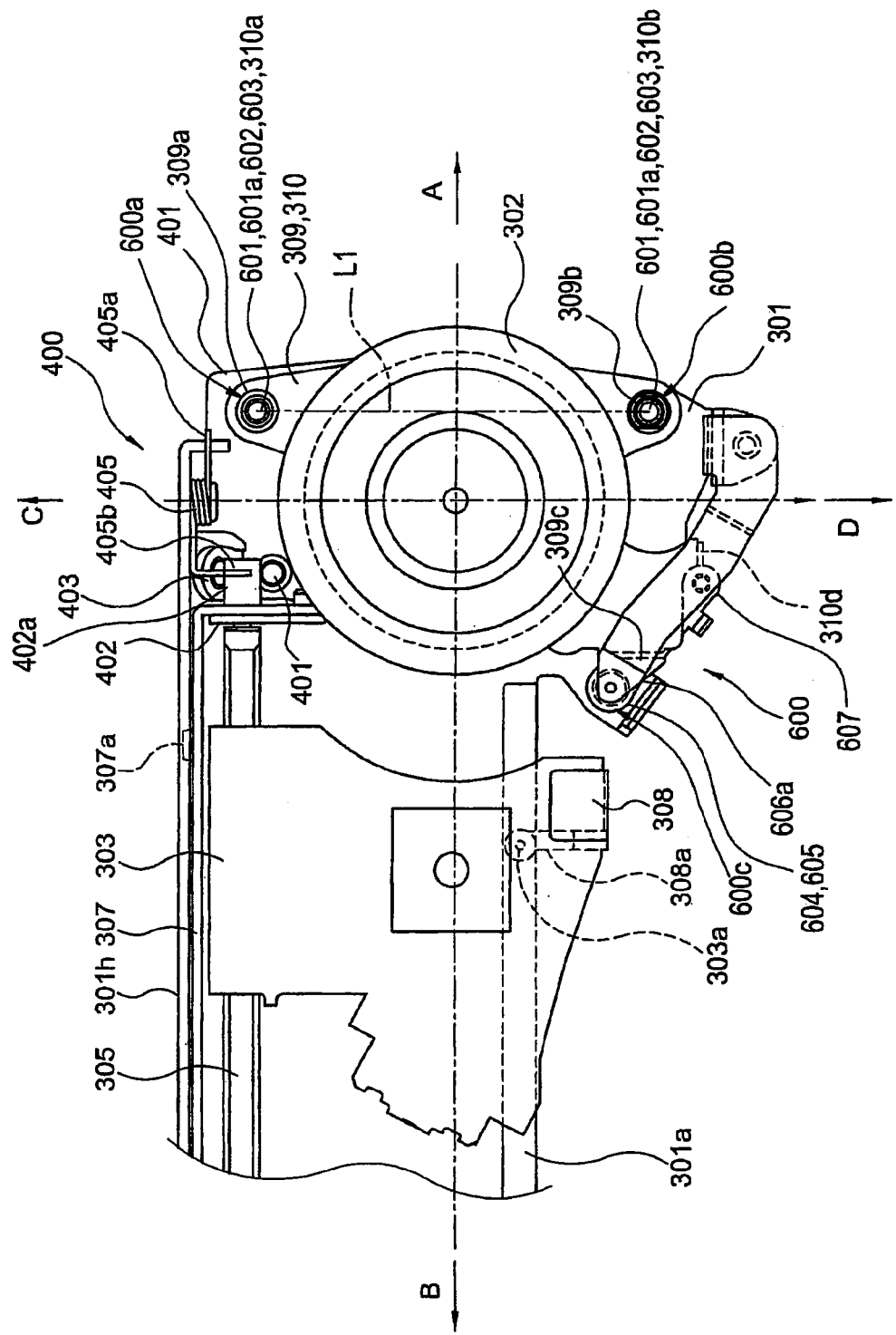
FIG. 18 A top view of a turntable adjusting portion.
Figure 19:
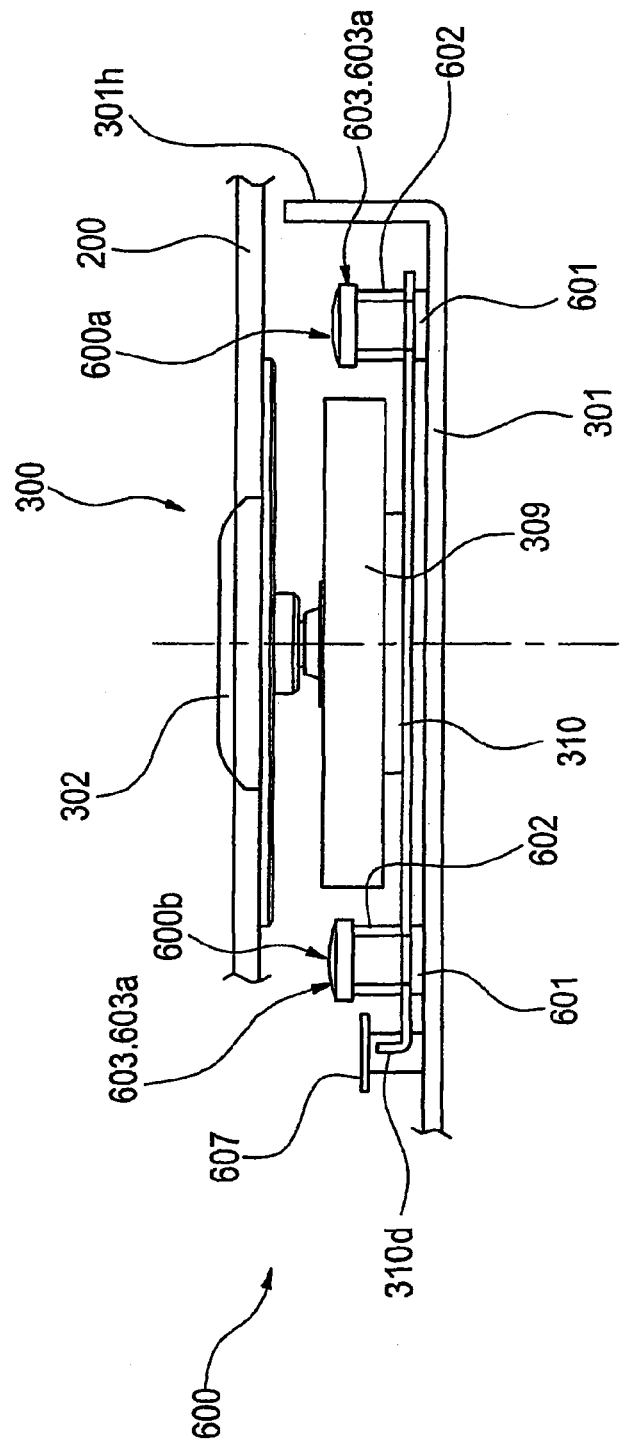
FIG. 19 A side view of a spindle motor portion.
Figure 20:
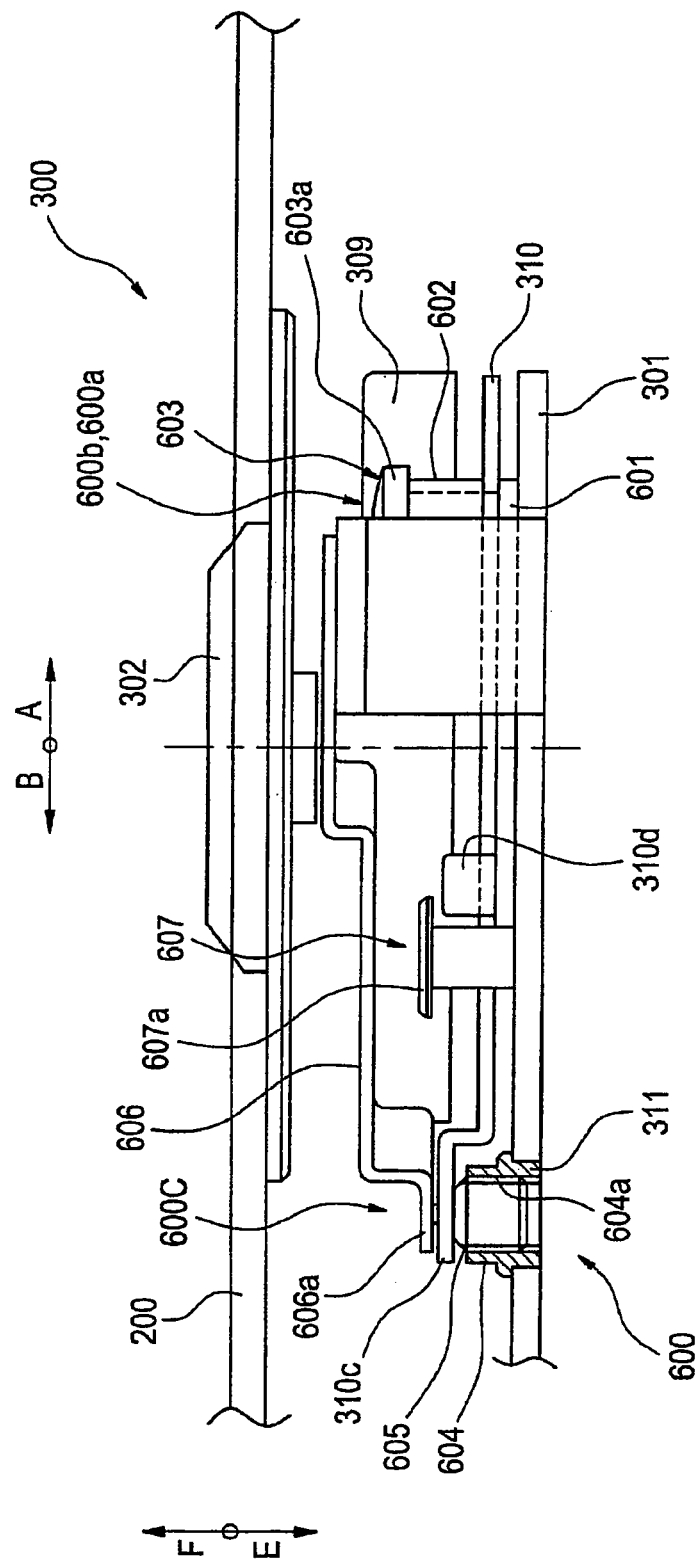
FIG. 20 An enlarged view of an essential portion of the turntable adjusting portion.

FIG. 18 is a top view of the turntable adjusting portion, FIG. 19 is a side view of the spindle motor portion, and FIG. 20 is an enlarged view of an essential portion of the turntable adjusting portion.

In FIG. 18 to FIG. 20, the turntable adjusting portion 600 changes an inclination of the disc loading face of the turntable 302, and thus adjusts the light beam 303b emitted from the optical pickup 303 such that its optical axis 303c is set perpendicularly to the disc 200.

As shown in FIG. 18, the turntable adjusting portion 600 has fixing portions 600a, 600b positioned at two locations, and one adjusting portion 600c. The fixing portions 600a, 600b are arranged such that a straight line L1 connecting the centers of both fixing portions 600a, 600b is positions in the direction that intersects orthogonally with the moving direction of the optical pickup 303 in the recording/reproducing operation (the C-C direction in FIG. 18). Also, the adjusting portion 600c is arranged such that this adjusting portion is positioned away in the moving direction of the optical pickup 303 in the recording/reproducing operation (the A side or the B side in FIG. 18) from the straight line L1 connecting the centers of both fixing portions 600a, 600b.

More particularly, as shown in FIG. 20, the spindle motor 309 is fitted integrally to a base plate 310, and guide holes 310a, 310b are provided in the base plate 310 as through holes to correspond to two fixing portions 600a, 600b. Also, supporting members 601, 601 passing through the guide holes 310a, 310b respectively are provided upright to the base plate 310 to correspond to two fixing portions 600a, 600b. A fastening member 603 is screwed into the top end face of the supporting members 601, and a spring 602 is fitted between a head portion 603a of the upper end portion of the fastening member 603 and an upper face of the base plate 310. Therefore, the base plate 310 is always energized by the spring 602 toward the base chassis 301 side.

As shown in FIG. 20, in the adjusting portion 600c, an internal thread shaft 604 is fitted into a fitting hole 311 provided in the base chassis 301. This internal thread shaft 604 is formed like a cylindrical shape, and an internal thread 604a is formed in the internal thread shaft 604. An adjust screw 605 as an adjusting member is screwed into the internal thread 604a in the internal thread shaft 604, and the adjust screw 605 can be turned from a lower opening of the internal thread shaft 604. Also, a bent portion 310c that is bent upward to correspond to the adjusting portion 600c is formed on the base plate 310, and a plate spring 606 is provided on the upper side of the bent portion 310c to energize always the bent portion 310c in the direction E (downward). Since the bent portion 310c is supported from the lower side by the top end face of the adjust screw 605, the bent portion 310c of the base plate 310 is always brought into contact with the upper end face of the adjust screw 605.

Therefore, when the adjust screw 605 is moved in the F direction in FIG. 20 by turning the adjust screw 605 forward, the adjusting portion 600c side of the base plate 310 is can be lifted up around the fixing portions 600a, 600b of the base plate 310 as fulcrums. Also, when the adjust screw 605 is moved in the direction E by turning the adjust screw 605 backward, the bent portion 310c of the base plate 310 is moved in the direction E by an energizing force of the spring 606. As a result, a distance between the optical pickup 303 and the disc 200 put on the turntable 302 can be adjusted by adjusting an inclination of the spindle motor 309. The tilt adjustment for adjusting the light beam 303b emitted from the optical pickup 303 such that its optical axis 303c is set perpendicularly to the disc 200 loaded on the turntable 302 can be carried out. Also, even when the spindle motor 309 is tilted in the tilt adjustment and a relative distance between the fastening member 603 and the spindle motor 309 is changed in the fixing portions 600a, 600b acting as the fulcrums of tilt, the spring 602 is expanded and contracted. As a result, the spindle motor 309 is never distorted/deformed, and thus the stable tilt adjustment can be carried out.

A stopper portion 607 as a disc turning portion restricting member having a shade portion 607a on its top end is fitted on the base plate 310 between the fixing portion 600b and the adjusting portion 600c. A projection 310d is provided on the base plate 310 under the shade portion 607a. When the base plate 310 moves upward by a predetermined height, such base plate 310 comes in touch with the shade portion 607a of the stopper portion 607. Thus, the base plate 310 is restricted not to go up further more.

Therefore, even when an impact in excess of a spring load is applied to the spindle motor 309 held with a pressure by the spring 606 during the falling down or the transportation of the products, or the like and then the spindle motor 309 is moved away from the base chassis 301 (in the direction F in FIG. 20), the projection 310d provided to the base plate 310 of the spindle motor 309 comes into contact with the shade portion 607a of the stopper portion 607. As a result, such a situation can be prevented that a load for causing a failure of the spring 606 is applied by the impact, or the like.

Also, the straight line L1 connecting two fixing portions 600a, 600b acting as the fulcrums of the inclination of the spindle motor 309 is arranged in a position that intersect orthogonally with the transfer direction of the optical pickup 303. Therefore, the spindle motor 309 is never tilted in the tangential direction (the C direction in FIG. 18 and the D direction in FIG. 18), a tilt in the radial direction (the A direction in FIG. 18 and the B direction in FIG. 18) can be adjusted by proceeding/retreating the adjust screw 605 of the adjusting portion 600c, and the tilt adjustment can be carried out stably and easily.

Second Embodiment

Next, a disc device 100B according to a second embodiment of the present invention will be explained hereunder.

Figure 21:
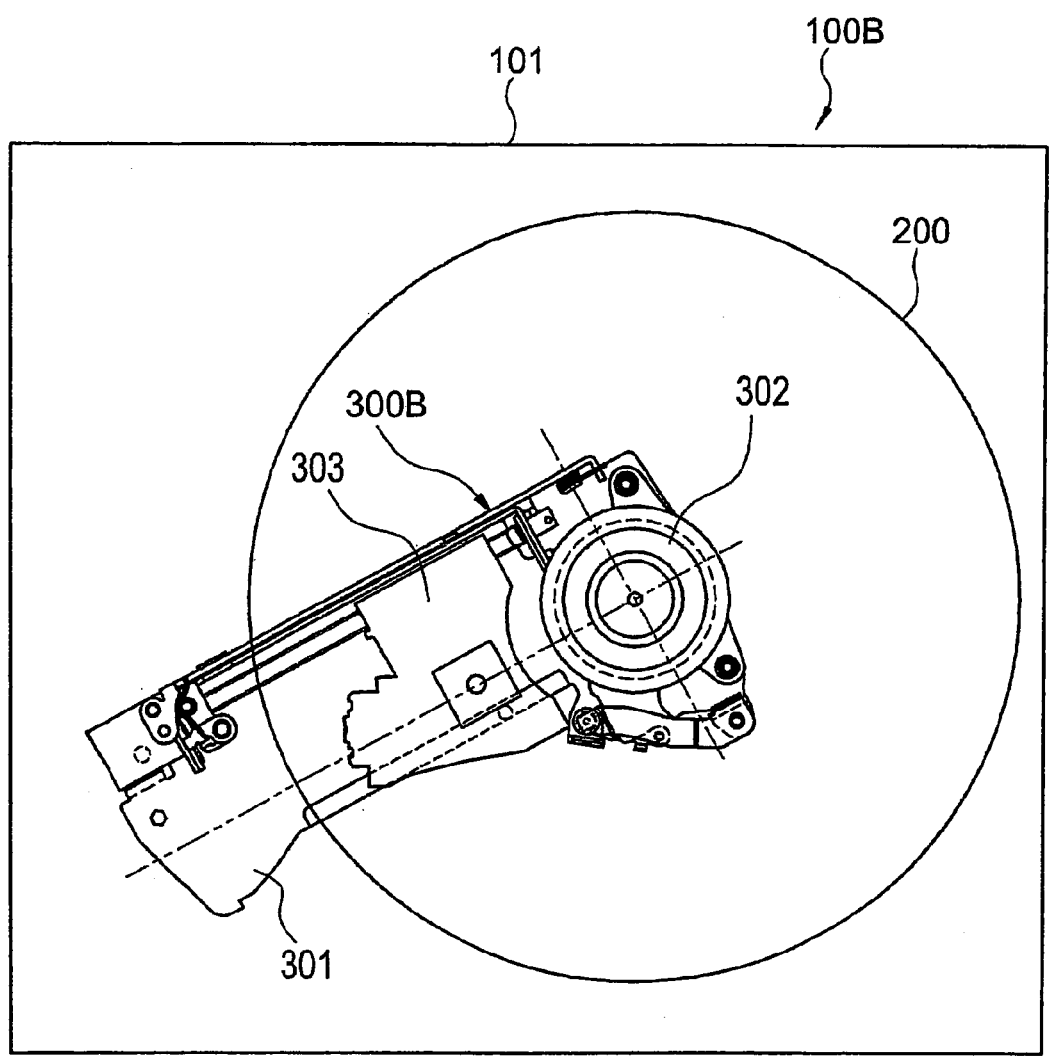
FIG. 21 A top view of an essential portion of a disc device of a second embodiment of the present invention.

FIG. 21 is a top view of an essential portion of a disc device of a second embodiment of the present invention. Here, the same reference symbols are affixed to the portions common to those in the foregoing first embodiment, and their redundant explanation will be omitted herein.

In FIG. 21, a disc recording/reproducing portion 300B for performing the recording/reproducing of the disc 200 is provided in the center of the case 101 of a disc device 100B.

Next, the disc recording/reproducing portion 300B will be explained hereunder.

Figure 22:
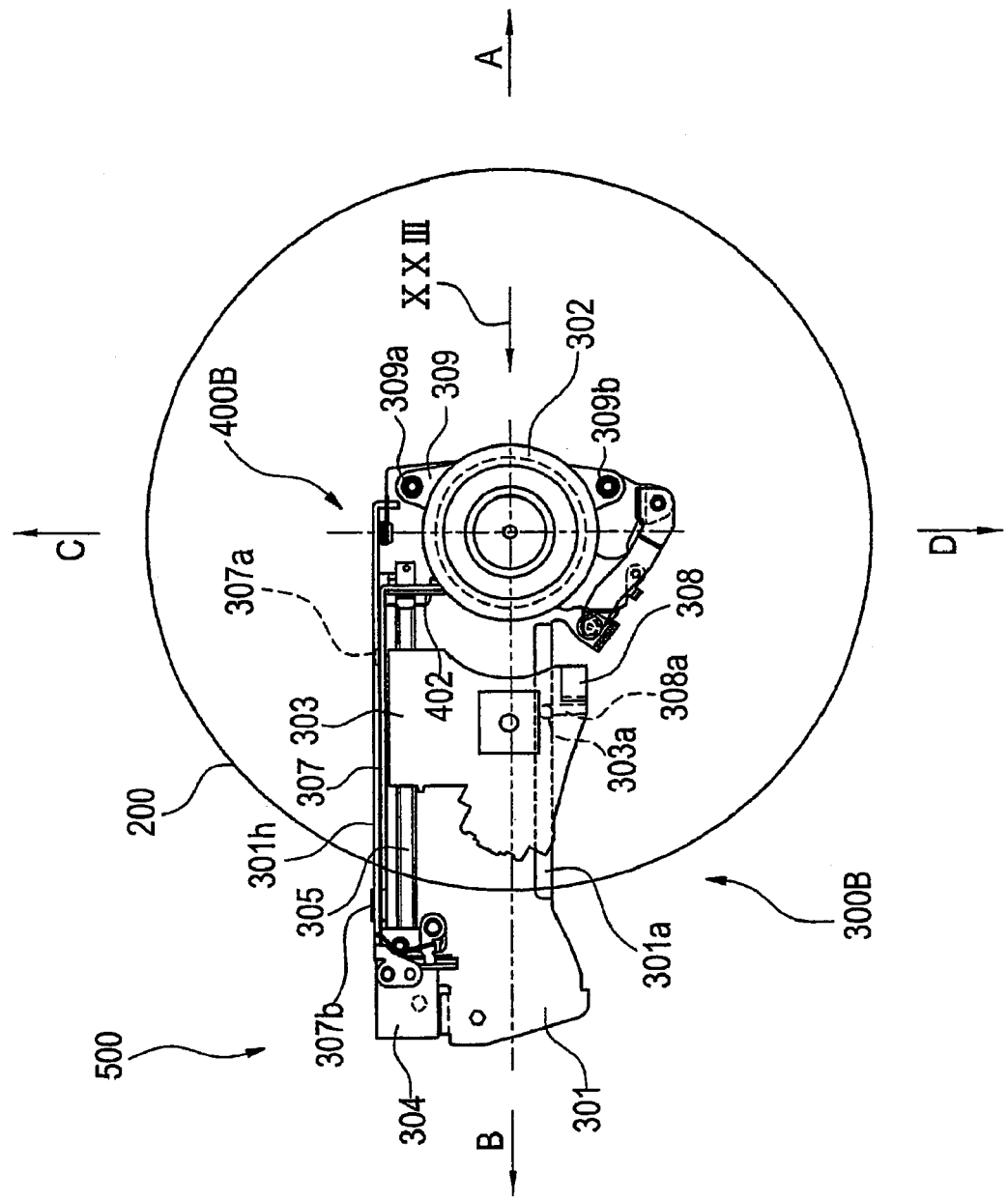
FIG. 22 A top view of a disc recording/reproducing portion according to a second embodiment of the present invention.
Figure 23:
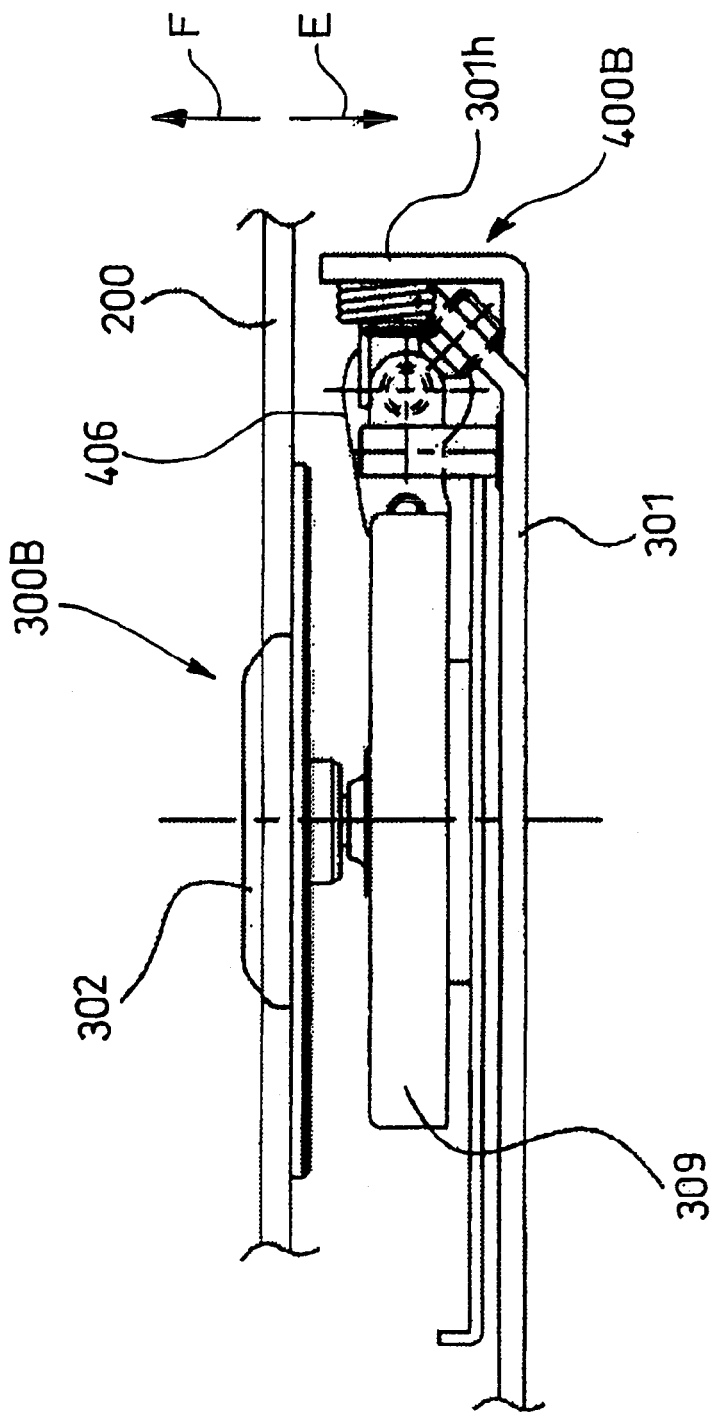
FIG. 23 A side view of the disc recording/reproducing portion viewed from a XXIII direction in FIG. 22.
Figure 24:
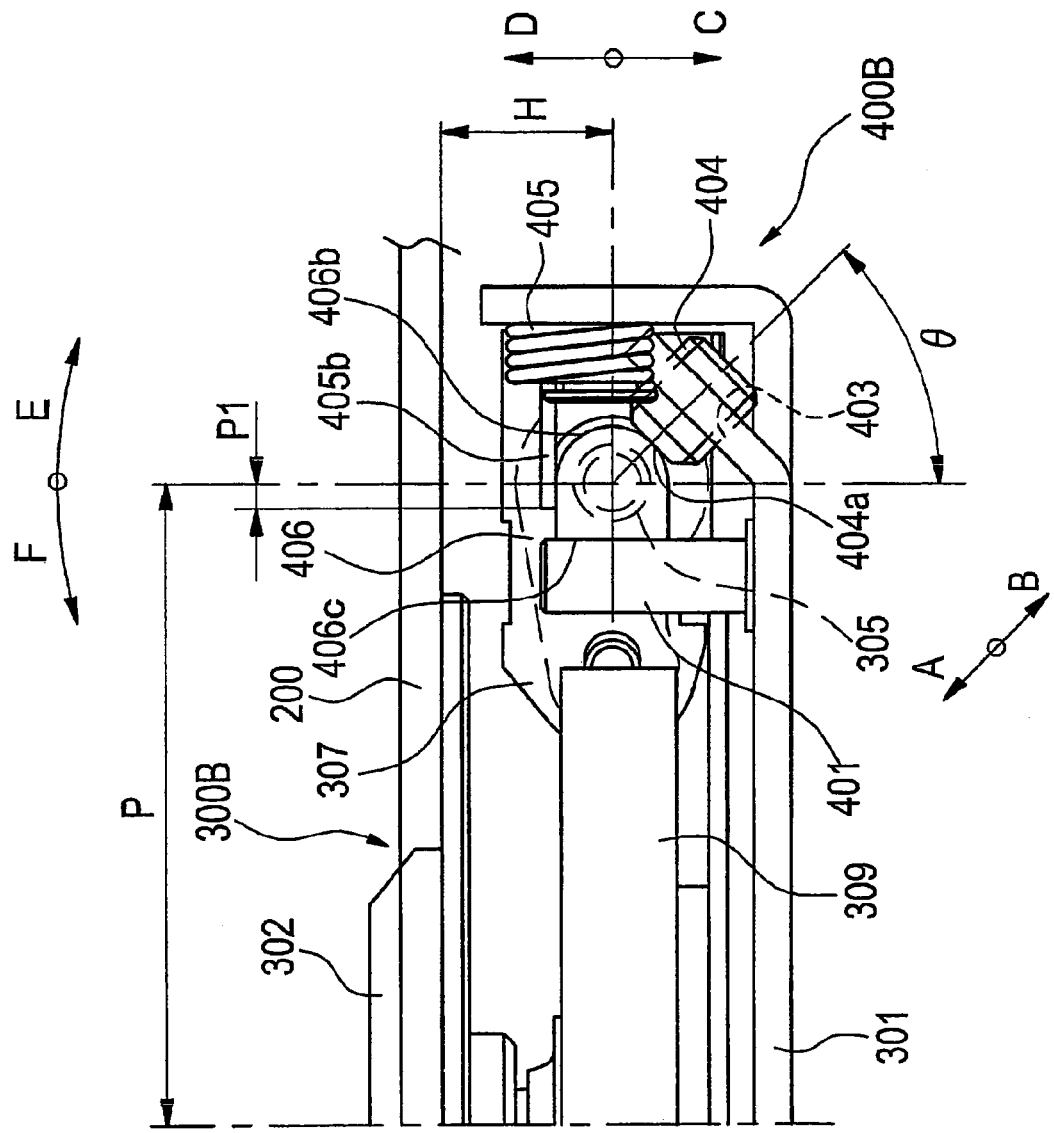
FIG. 24 An enlarged view of an essential portion in FIG. 23.
Figure 25:
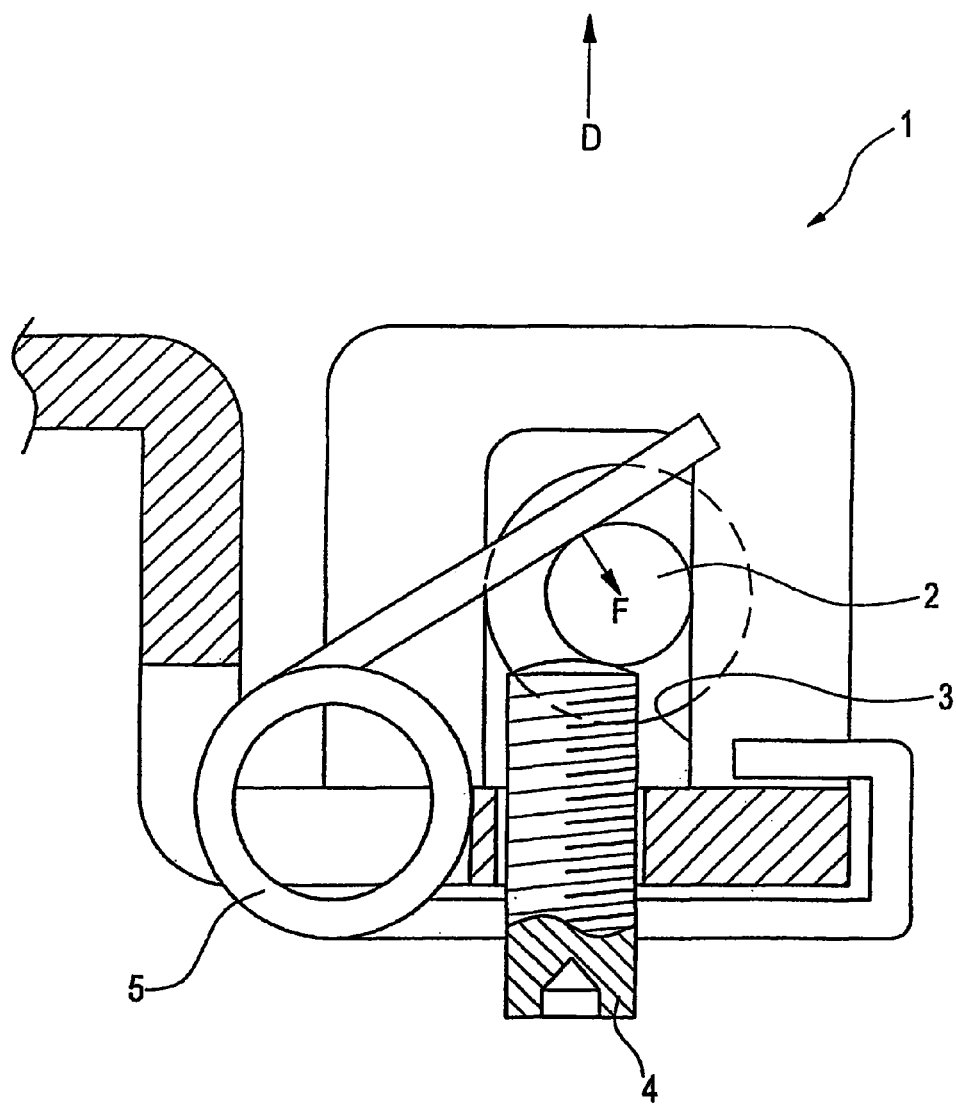
FIG. 25 A sectional view showing a tilt adjusting portion in the disc device in the prior art.

FIG. 22 is a top view of the disc recording/reproducing portion according to the second embodiment of the present invention, FIG. 23 is a side view of the disc recording/reproducing portion viewed from a XXIII direction in FIG. 22, and FIG. 24 is an enlarged view of an essential portion in FIG. 23.

In FIGS. 22 and 23, the disc recording/reproducing portion 300B has an optical pickup adjusting portion 400B, and others. When a distance between the disc 200 loaded on the turntable 302 and the feed screw 305 is changed, the optical pickup adjusting portion 400B adjusts the light beam 303b emitted from the optical pickup 303 such that its optical axis 303c is set perpendicularly to the disc 200 put on the turntable 302.

Next, the tilt adjusting portion 400B will be explained hereunder. Here, the same reference symbols are affixed to the portions that have already been explained in the first embodiment, and their redundant explanation will be omitted herein.

In FIGS. 22 to 24, the tilt adjusting portion 400B has a cap 406 inserted into the top end of the feed screw 305, and the frame 307 one end of which is fixed to the motor bracket 304a of the traverse motor 304 and the other end of which is fixed to the cap 406.

A hole into which the top end of the feed screw 305 is inserted is provided in the center of the cap 406. The feed screw 305 is supported rotatably in the cap 406 when the top end portion of the feed screw 305 is inserted into the hole of the cap 406. Also, a outer peripheral face 406b having a cylindrical shape is provided on the outer periphery of the cap 406, which contacts the plane portion 404a of the adjust screw 404 and the arm 405b of the torsion coil spring 405. In contrast, an outer peripheral face 406c having a planar shape is provided on the outer periphery of the cap 406, which contacts the guide shaft 401. That is, an outer peripheral surface of the cap 406 is constructed like an almost D-shape.

Therefore, an outer peripheral face 406b of the cap 406 is always brought into contact with the plane portion 404a of the adjust screw 404 by the spring force of the torsion coil spring 405. Also, the outer peripheral face 406c of the cap 406 always contacts the guide shaft 401. As a result, when a distance between the cap 406 and the disc 200 is adjusted by moving the adjust screw 404, the tilt adjustment for adjusting the light beam 303b emitted from the optical pickup 303 such that its optical axis 303c is set perpendicularly to the disc 200 put on the turntable 302 can be carried out.

Also, even when a distance between the cap 406 and the disc 200 loaded on the turntable 302 in the height direction (the dimension H in FIG. 24) is changed in the tilt adjustment, a contact between the guide shaft 401 and the outer peripheral face 406c of the cap 406 is maintained. Therefore, a pitch between the center of the feed screw 305 and the center of the disc 200 loaded on the turntable 302 (the dimension P in FIG. 24) is always kept constant, and thus the stable recording/reproducing can be performed.

Also, the outer peripheral face 406c of the cap 406 has a planar shape and the outer peripheral face 406b of the cap 406 has a cylindrical shape. Therefore, the guide shaft 401 and the outer peripheral face 406c of the cap 406 can always maintain a linear contact face. In other words, the cap 406 and the frame 307 can be moved in the direction to adjust a distance between the cap 406 and the disc 200, while holding a posture in the rotating direction (the directions E, F in FIG. 24) of the feed screw 305 constant with respect to the guide shaft 401 and the base chassis 301 without a particular guiding portion.

As described above, the tilt adjusting portion 400B according to the second embodiment is constructed. Hence, an amount of movement of the adjust screw 404 as the tilt adjusting member can be reduced smaller that a necessary amount of tilt adjustment in the optical pickup adjusting portion 500 (see FIG. 22), and also the tilt adjustment can be executed while keeping the postured the components such as the cap 406, the frame 307, etc. and the base chassis 301 constant during the tilt adjusting operation. As a result, the slimming down of the tilt adjusting portion 400B and the number-of-components saving of the optical pickup adjusting portion 400B become mutually compatible.

In the above embodiment, the guide shaft 401 is arranged on the center side of the turntable 302, and the adjust screw 404 is arranged on the outer side. In this case, as shown in FIG. 14, the adjust screw 404 may be arranged on the center side, and the guide shaft 401 may be arranged on the outer side.

Also, in the above embodiment, the traverse motor 304 and the feed screw 305 are constructed integrally. According to the present invention, a power transmitting portion such as a gear, or the like, for example, may be provided between the traverse motor 304 and the feed screw 305. In this case, the similar tilt adjusting portion 400B can be implemented by providing the cap 406 to both end portions of the feed screw 305.

Also, in the present embodiment, both a function of transmitting a driving force to move the optical pickup 303 to the inner periphery and the outer periphery and a function of guiding a movement of the optical pickup 303 are performed compatibly by the feed screw 305. According to the present invention, a guiding member different from the feed screw 305 may be provided and the tilt adjustment may be applied to this guiding member.

Also, in the present embodiment, the base chassis 301 and the cap 402 are energized by the torsion coil spring 405. According to the present invention, both members may be energized by another energizing member except the torsion coil spring (e.g., a plate spring, a tensile coil spring, a compression spring, or the like).

Also, in the present embodiment, the contact portions between the cap 406 and the plane portion 404a of the adjust screw 404 and the arm 405b of the torsion coil spring 405 are implemented by the cylindrical portion 406b having the same diameter and provided to the cap 406. According to the present invention, respective contact portions may be implemented by cylindrical faces having a different diameter respectively.

Also, in the present embodiment, the tilt adjusting portion 400B is implemented by adjusting a height of the guiding portion of the optical pickup 303. According to the present invention, since the shapes similar to the outer peripheral faces 406b, 406c of the cap 406 are provided to the spindle motor 309, the tilt adjustment may be implemented by adjusting a height of the spindle motor 309.

In addition, in the first embodiment and the second embodiment, explanation is made by using the so-called changer type disk drive, in which plural sheets of trays are provided and also the base chassis is provided to turn and move vertically, as the disc device 100. In this case, even when the present invention is applied to the disc device that performs the recording/reproducing operation by emitting the light beam onto the disc loaded on the turntable from the optical pickup that can be moved in the radial direction of the disc loaded on the turntable, irrespective of that the trays are present or not and the base chassis can be turned or moved vertically, the similar advantages can be achieved.

The present application is based upon Japanese Patent Application (Patent Application No. 2006-281441) filed on Oct. 16, 2006; the contents of which are incorporated herein by reference.

INDUSTRIAL APPLICABILITY

As described above, in the disc device according to the present invention, the tilt adjusting member is moved in the direction oblique to the guide face and the direction perpendicular to the optical pickup driving portion. Therefore, the disc device according to the present invention can possess such advantages that an amount of movement of the tilt adjusting member can be reduced smaller than the necessary amount of tilt adjustment of the optical pickup and also a slimming down of the tilt adjusting portion can be achieved, and is useful for the disc device that is capable of achieving a slimming down of the tilt adjusting portion that can adjust the optical axis of the light beam emitted from the optical pickup in the direction perpendicular to the information recording face of the disc, and others.

The invention claimed is:

1. A disc device, comprising:
    a disc turning portion which turns a disc;
    an optical pickup which performs an information recording operation or an information reproducing operation by emitting a light beam onto the disc turned by the disc turning portion;
    an optical pickup guiding member which holds the optical pickup movably in a radial direction of the disc loaded on the disc turning portion;
    an optical pickup driving portion which moves the optical pickup; and
    a tilt adjusting portion which adjusts an optical axis of the light beam emitted from the optical pickup in a direction perpendicular to the disc that is loaded on the disc turning portion;
    wherein the tilt adjusting portion has a guide face that is perpendicular to the disc loaded on the disc turning portion, a tilt adjusting member that moves the optical pickup driving portion along the guide face, and an energizing member that presses the optical pickup driving portion against the tilt adjusting portion and the guide face; and
    wherein the tilt adjusting member is provided so as to move forward and backward in a direction oblique to the guide face and a direction perpendicular to the optical pickup driving portion, and the tilt adjusting member and the guide face are arranged so as to oppose to the optical pickup driving portion.

2. The disc device according to claim 1, wherein the tilt adjusting member is provided in an opposite direction of the disc loaded on the disc turning portion to the optical pickup driving portion.

3. The disc device according to claim 1, wherein the optical pickup driving portion has a first contact face that contacts the guide face, a second contact face that contacts the tilt adjusting member, and a third contact face that contacts the energizing member; and
    wherein the first contact face is formed of a flat plane, and the second contact face and the third contact face are formed of a cylindrical face.

4. The disc device according to claim 1, wherein the energizing member presses the optical pickup in a direction being parallel with a moving direction of the optical pickup driving portion when a tilt adjustment is performed.

5. An electronic device equipped with the disc device set forth in claim 1.

* * * * *